United States Patent
Kropaczek et al.

(10) Patent No.: US 7,200,541 B2
(45) Date of Patent: Apr. 3, 2007

(54) METHOD AND ARRANGEMENT FOR DETERMINING NUCLEAR REACTOR CORE DESIGNS

(75) Inventors: David Joseph Kropaczek, Kure Beach, NC (US); William Earl Russell, III, Wilmington, NC (US); Steven Barry Sutton, Wilmington, NC (US); Christian Carlos Oyarzun, Wrightsville Beach, NC (US); William Charles Cline, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 557 days.

(21) Appl. No.: 10/325,831

(22) Filed: Dec. 23, 2002

(65) Prior Publication Data

US 2004/0122632 A1 Jun. 24, 2004

(51) Int. Cl.
*G06F 17/50* (2006.01)

(52) U.S. Cl. .............................. 703/13; 703/6; 376/353; 376/411; 376/381; 376/256; 706/11

(58) Field of Classification Search ................ 703/13, 703/6, 2, 14; 376/353, 411, 381, 245, 435, 376/122, 254, 283, 259, 256; 706/11; 717/141; 345/473

See application file for complete search history.

(56) References Cited

U.S. PATENT DOCUMENTS

| | | | |
|---|---|---|---|
| 4,851,186 A * | 7/1989 | Berte et al. ............... 376/364 |
| 5,790,618 A * | 8/1998 | Fawks, Jr. ................ 376/259 |
| 5,923,717 A * | 7/1999 | Fawks, Jr. ................ 376/245 |
| 6,026,136 A * | 2/2000 | Radkowsky ............... 376/173 |
| 6,208,982 B1 * | 3/2001 | Allen et al. ............... 706/11 |
| 6,243,860 B1 * | 6/2001 | Holland .................... 717/141 |
| 6,263,038 B1 * | 7/2001 | Kantrowitz et al. ........ 376/435 |
| 6,338,149 B1 * | 1/2002 | Ciccone et al. ............ 714/38 |
| 6,404,437 B1 * | 6/2002 | Russell et al. ............. 345/473 |
| 6,430,247 B1 * | 8/2002 | Mourlevat et al. ......... 376/254 |
| 6,526,116 B1 * | 2/2003 | Nguyen et al. ............ 376/439 |
| 6,701,289 B1 * | 3/2004 | Garnett et al. ............. 703/14 |
| 6,748,348 B1 * | 6/2004 | Russell, II ................. 703/6 |
| 6,934,350 B1 * | 8/2005 | Challberg et al. .......... 376/353 |
| 2002/0085660 A1 * | 7/2002 | Nakamaru et al. ......... 376/283 |
| 2002/0101949 A1 * | 8/2002 | Nordberg .................. 376/122 |
| 2002/0101951 A1 * | 8/2002 | Nakamaru et al. ......... 376/282 |
| 2003/0086520 A1 * | 5/2003 | Russell et al. ............. 376/259 |
| 2004/0013220 A1 * | 1/2004 | Casillas et al. ............ 376/245 |
| 2004/0052326 A1 * | 3/2004 | Blanpain et al. ........... 376/411 |
| 2004/0059549 A1 * | 3/2004 | Kropaczek et al. ......... 703/2 |

(Continued)

*Primary Examiner*—K. Thangavelu
(74) *Attorney, Agent, or Firm*—Harness, Dickey & Pierce, P.L.C.

(57) ABSTRACT

In the method, a set of limits are defined and a reference core design is generated based on the limits, and includes an initial loading pattern of current fresh fuel bundles arranged in a plurality of fuel locations. A unique subset of fresh fuel bundles is selected for evaluation as the reference core design is subjected to an iterative improvement process. The iterative process includes replacing, at each fuel location, at least one of the current fresh fuel bundles with at least one of the selected fresh fuel bundles, and simulating reactor operation on the reference core design to obtain a plurality of outputs. The outputs may be ranked based on the defined set of limits, and the highest ranked output may be selected as an accepted core design for the nuclear reactor.

31 Claims, 15 Drawing Sheets

U.S. PATENT DOCUMENTS

| | | | |
|---|---|---|---|
| 2004/0059696 A1* | 3/2004 | Kropaczek et al. | 706/46 |
| 2004/0066875 A1* | 4/2004 | Bazant | 376/381 |
| 2004/0096101 A1* | 5/2004 | Mori et al. | 382/162 |
| 2004/0101083 A1* | 5/2004 | Russell et al. | 376/256 |
| 2004/0122629 A1* | 6/2004 | Russell et al. | 703/2 |
| 2004/0191734 A1* | 9/2004 | Russell et al. | 434/218 |
| 2004/0220787 A1* | 11/2004 | Russell et al. | 703/6 |
| 2005/0015227 A1* | 1/2005 | Kropaczek et al. | 703/6 |
| 2005/0018806 A1* | 1/2005 | Gautier et al. | 376/406 |
| 2006/0149514 A1* | 7/2006 | Kropaczek et al. | 703/6 |

* cited by examiner

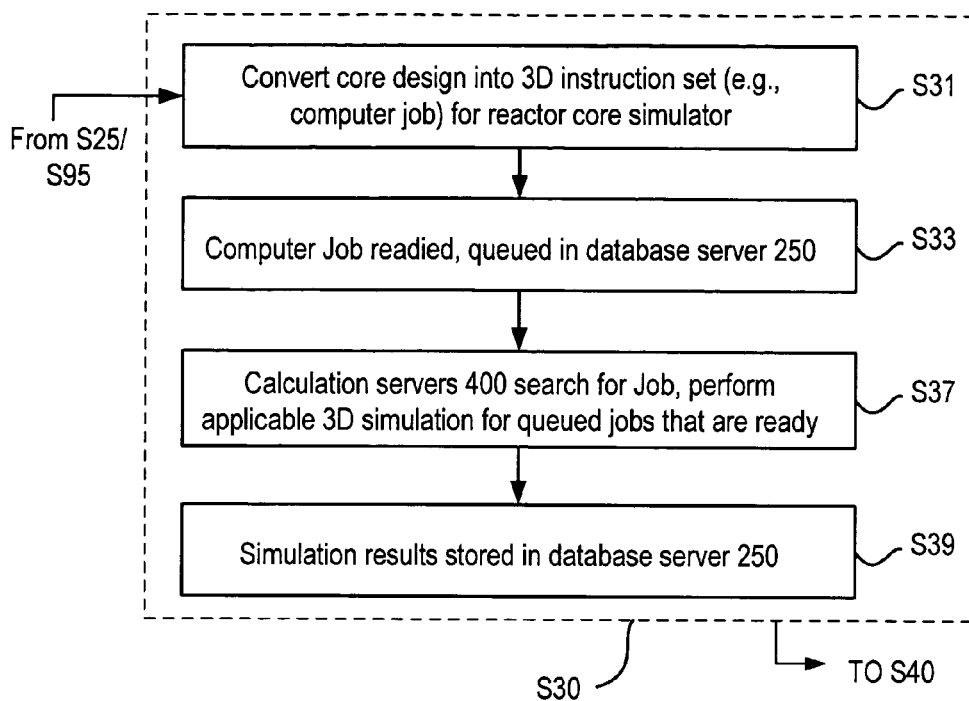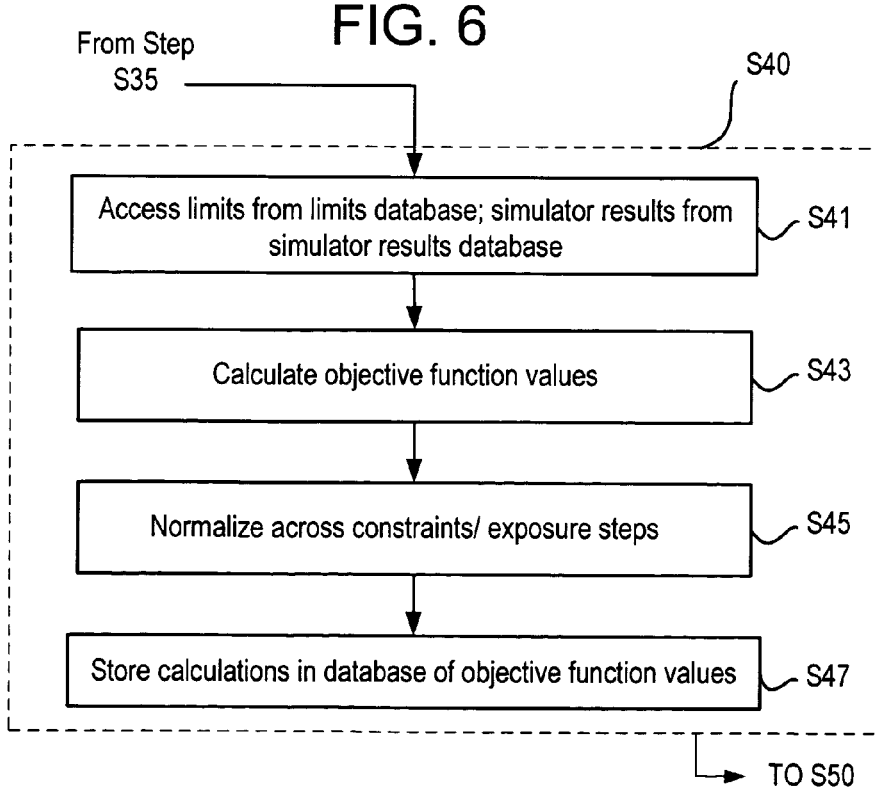

FIG. 14 ePrometheus - Hatch 1 - Cycle 1 - Test 5b - CS10:2671 <Online Operation>

WorkSpace  Input  Run  View  Reports  Window  Help

Input Deck

| Plant Configuration | Optimization Configuration | Optimization Constraints | Operations Configuration | Fuel Shuffling | Eigenvalue & Operating Limit | Select Files |

Optimization Configuration       1458

| Constraint Description | Importance | Exposure Dependence | Design Value | Objective Add Funct. | Optimization Credits |
|---|---|---|---|---|---|
| Maximum MFLCPR — 1450 | Nominal ▶ | ☐ Edit | 0.964 | ☐ | None ▶ |
| Maximum MFLPD  1456 | Nominal ▶ | ☐ Edit | 0.957 | ☐ 1452 1454 | None ▶ |
| Maximum MAPLHGR | Nominal ▶ | ☐ Edit | 0.957 | ☐ | None ▶ |
| Minimum % Flow | Nominal ▶ | ☐ Edit | 85.0 | ☐ | None ▶ |
| Maximum % Flow | None ▶ | ☐ Edit | 100.0 | ☐ | None ▶ |
| Eigenvalue Upper Tolerance (ΔCycle) | None ▶ | ☐ Edit | 1.0E-4 | ☐ | None ▶ |
| Eigenvalue Lower Tolerance (ΔCycle) | | ☐ Edit | 1.0E-4 | | | though, but will profligate with time and iterations to
METHOD AND ARRANGEMENT FOR DETERMINING NUCLEAR REACTOR CORE DESIGNS

BACKGROUND OF THE INVENTION

1. Field of the Invention

This invention relates generally to nuclear reactors, and more particularly to determining a reactor core design for the reactor.

2. Related Art

A core of a nuclear reactor such as boiling water reactor (BWR) or pressurized water reactor (PWR) has several hundred individual fuel bundles (fuel assemblies) of fuel rods (BWR) or groups of fuel rods (PWR) that have different characteristics. These bundles (fuel rod groups) are preferably arranged so that interaction between rods within a fuel bundle (rod group), and between fuel bundles (fuel rod groups) satisfies all regulatory and reactor design constraints, including governmental and customer-specified constraints. Additionally, the core design must be determined so as to optimize core cycle energy. Core cycle energy is the amount of energy that a reactor core generates before the core needs to be refreshed with new fuel elements, such as is done at an outage.

In the case of a BWR, for example, the number of potential bundle arrangements within the core and individual fuel element arrangements within a bundle may be in excess of several hundred factorial. From these many different possible configurations, only a small percentage of core designs may satisfy all applicable design constraints. Further, only a small percentage of these core designs, which do satisfy all applicable design constraints, are economical.

Traditionally, core design determinations have been made on a trial and error basis. Specifically, and based on only the past experience of the engineer or designer, in designing a core design an initial core design was identified. The initially identified design was then simulated in a computer. If a particular design constraint was not satisfied, then the arrangement was modified and another computer simulation was run. Many weeks of resources typically were required before an appropriate core design was identified using the above-described procedure.

For example, a current process being used is a stand-alone manual design process that requires a designer to repeatedly enter reactor plant specific operational parameters into an ASCII text file, which is an input file. Data entered into the input file includes blade notch positions of control blades (if the evaluated reactor is a boiling water reactor (BWR)), core flow, core exposure (e.g., the amount of burn in a core energy cycle, measured in mega-watt days per short time (MWD/st), etc.

A Nuclear Regulatory Commission (NRC) licensed core, simulation program reads the resulting input file and outputs the results of the simulation to a text or binary file. A designer then evaluates the simulation output to determine if the design criteria have been met, and also to verify that no violations of margins to thermal limits have occurred. Failure to meet design criteria (i.e., violations of one or more limits) require a manual designer modification to the input file. Specifically, the designer would manually change one or more operation parameter and rerun the core simulation program. This process is repeated until a satisfactory core loading pattern is achieved.

This process is extremely time consuming. The required ASCII text files are laborious to construct, and often are error prone. The files are fixed-format and extremely long, sometimes exceeding five thousand or more lines of code. A single error in the file results in a crash of the simulator, or worse, results in a mildly errant result that may be hard to initially detect, but will profligate with time and iterations to perhaps reduce core cycle energy when placed in an actual operating nuclear reactor core.

Further, no assistance is provided via the manual iterative process in order to guide a designer toward a more favorable core loading pattern solution. In the current process, the responsible designer or engineer's experience and intuition are the sole means of determining a core design solution.

SUMMARY OF THE INVENTION

A method and arrangement for determining a core design to be used in a fuel cycle in a reactor core of a nuclear reactor is described. In the method, a set of limits applicable to determining a core design are defined and a reference core design is generated based on the defined limits. The reference core design includes an initial loading pattern of current fresh fuel bundles arranged in a plurality of fuel locations therein. A unique subset of fresh fuel bundles is selected, to be evaluated in the reference core design and a first iterative improvement process is performed. The first iteration may include replacing, at each fuel location, at least one of the current fresh fuel bundles with at least one of the selected fresh fuel bundles, and simulating reactor operation on the reference core design to produce a plurality of outputs. Each output may correspond to the reference core design containing one or more of the selected fresh fuel bundles. The outputs may be ranked based on the defined set of limits, and the highest ranked output may be selected as an accepted core design for the nuclear reactor.

BRIEF DESCRIPTION OF THE DRAWINGS

The present invention will become more fully understood form the detailed description given herein below and the accompanying drawings, wherein like elements are represented like reference numerals which are given by way of illustration only and thus are not limitative of the present invention and wherein:

FIG. 5 is a flow chart illustrating a simulation step in accordance with an exemplary embodiment of the invention;

FIG. 6 is a flow chart illustrating the ranking step of FIG. 4 in more detail in accordance with an exemplary embodiment of the invention;

FIGS. 8–14 are screen shots of an exemplary computer-based application to further describe various features of the method and arrangement of the present invention.

DETAILED DESCRIPTION

A method and arrangement for determining a core design for a nuclear reactor is described. As used herein, the phrase "core design" refers to a core configuration of fuel assemblies that may include of specified loading pattern for fresh fuel assemblies that are to be loaded in a core of a nuclear reactor at a next scheduled outage, for example.

In an aspect, the arrangement may include an interface for communicating with the user and interacting with a computer-based system and/or processing medium (e.g., software-driven computer program, processor, applications driven by application servers, etc.). This enables the user to virtually create and evaluate core designs, in order to determine a desired fuel assembly configuration that may be implemented in a particular reactor core at the reactor plant's next scheduled outage, for example. The method and arrangement enables a user to provide feedback based on how closely a core design meets user-input constraints. The core design may be characterized by one or more fresh fuel assemblies, as well as information related to the placements of these assemblies in the core, to exposed fuel placements, to control blade patterns, etc.

The method and arrangement of the present invention provide several advantages. The method enables the determining of types and placements of fresh fuel bundles within a nuclear reactor core design, without regard to bundle complexity or number of fresh fuel bundle designs. In contrast to current core designs, which typically utilize one or two fresh fuel types (i.e., a one or two stream solution), any number or combinations of fresh fuel bundle designs (e.g., "N streams") may be utilized in order to determine the desired fuel bundles for placement. The method and arrangement allow for greater efficiency in core design with improved safety margins. The method allows for selection of N candidate fresh fuel bundles from a palette of fresh fuel bundle designs, to be evaluated in a reference core design, followed by successive iterative improvements in fresh fuel bundle "loading" patterns (e.g., patterns as to how the fresh fuel is to be loaded in the reactor during the next outage, for example).

Additionally, the method and arrangement utilize a computing environment to effect a substantial reduction in the amount of time needed to create desirable core designs for a nuclear reactor. The method adheres perfectly to a user's input constraints or design limits (e.g., if the calculated objective function value is not equal to zero, the particular core design may still be improved upon). The method and arrangement offer greater operational flexibility to change core designs rapidly and simulate the altered designs, as compared to the conventional manual iterative process. Further, errors are no longer made in attempting to generate a simulator input file, as described with respect to the manual iterative process.

Figure 1:
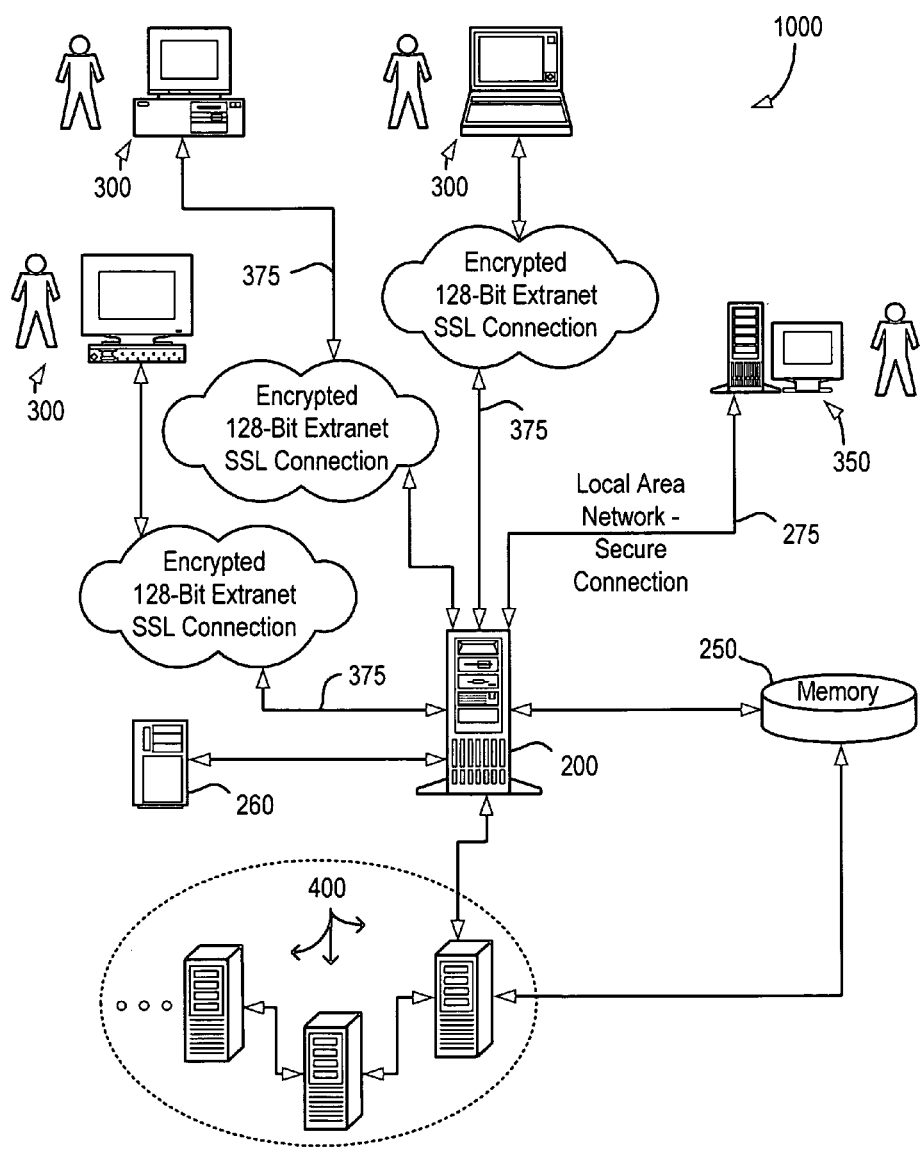
FIG. 1 illustrates an arrangement for implementing the method in accordance with an exemplary embodiment of the invention.

FIG. 1 illustrates an arrangement for implementing the method in accordance with and exemplary embodiment of the invention. Referring to FIG. 1, arrangement 1000 includes an application server 200, which may serve as a central nexus of an accessible website, for example. The application server 200 may be embodied as any known application server, such as a WINDOWS 2000 application server, for example. Application server 200 may be operatively connected to a plurality of calculation servers 400, a cryptographic server 260 and to a memory 250. Memory 250 may be embodied as a relational database server, for example.

A plurality of external users 300 may communicate with application server 200 over a suitable encrypted medium such as an encrypted 128-bit secure socket layer (SSL) connection 375, although the present invention is not limited to this encrypted communication medium. A user 300 may connect to the application server 200 over the internet or from any one of a personal computer, laptop, personal digital assistant (PDA), etc., using a suitable interface such as a web-based internet browser. Further, application server 200 is accessible to internal users 350 via a suitable local area network connection (LAN 275), so that internal users 350 have access over an intranet for example. The application server 200 is responsible for online security, for directing all calculations and accessing of data in order to calculate objective function values, and for the creation of suitable graphical representations of various features of a core design that a user may review. The graphical information is communicated over the 128-bit SSL connection 375 or LAN 275 (to be displayed on a suitable display device of the users 300/350. Hereinafter, the term user refers to both an internal user 300 and an external user 300. For example, the user may be any of a representative of a nuclear reactor plant accessing the website to determine a core design for his or her nuclear reactor, and/or a vendor hired by a reactor plant site to develop core designs by using the method and arrangement of the present invention.

Figure 2:
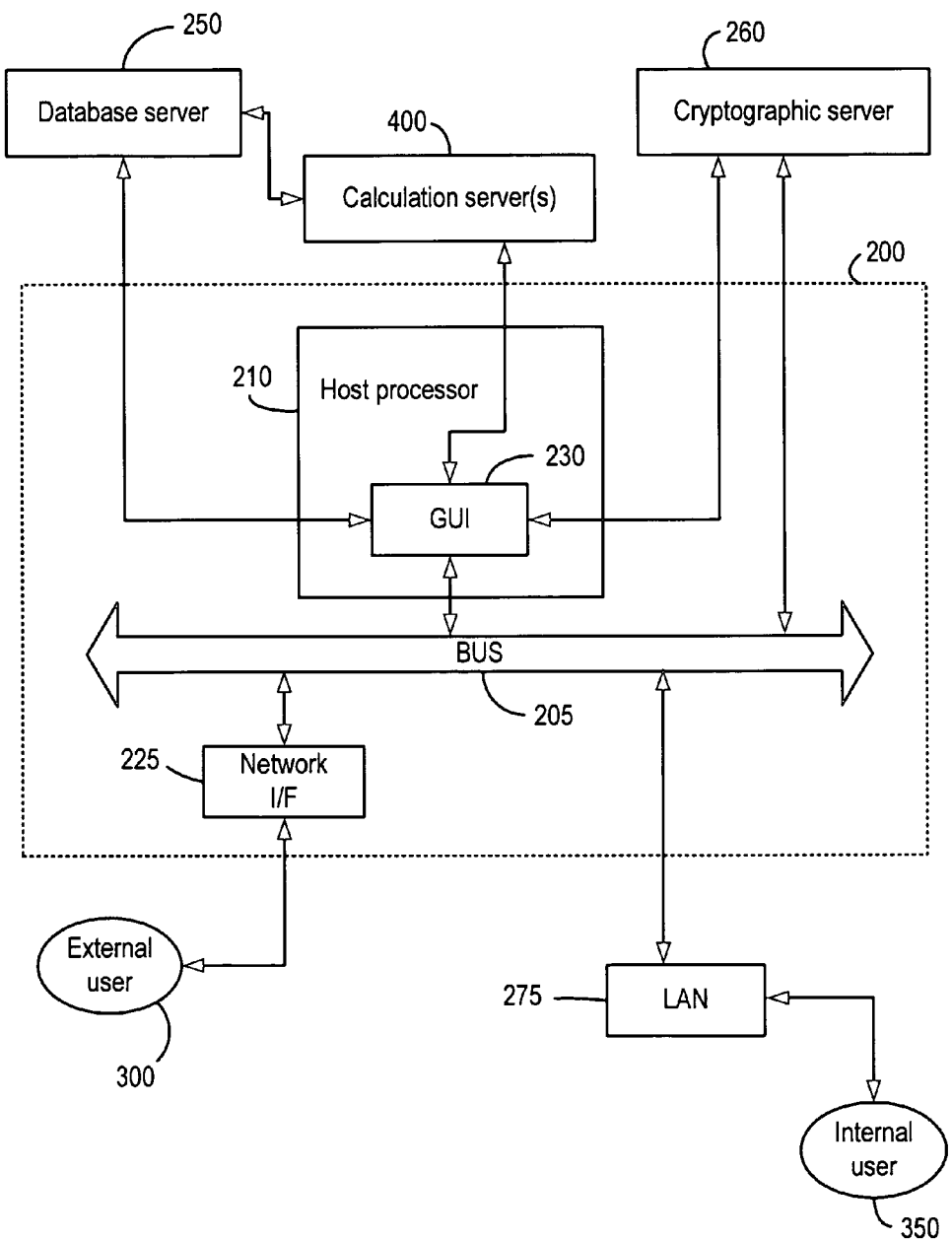
FIG. 2 illustrates an application server of the arrangement for implementing the method in accordance in an exemplary embodiment of the invention.

FIG. 2 illustrates an application server 200 associated with the arrangement of FIG. 1. Referring to FIG. 2, application server 200 utilizes a bus 205 to connect various components and to provide a pathway for data received from the users. Bus 205 may be implemented with conventional bus architectures such as peripheral components interconnect (PCI) bus that us standard in many computer architectures. Alternative bus architectures such as VMEBUS, NUBUS, address data bus, RAMbus, DDR (double data rate) bus, etc. could of course be utilized to implement bus 205. Users communicate information to application server 200 over a suitable connection (LAN 275 or network interface 225) to communicate with application server 200.

Application server 200 may also include a host processor 210, which may be constructed with conventional microprocessors such as currently available PENTIUM processors. Host processor 210 represents a central nexus from which all real time and non-real functions in application server 200 are performed, such as graphical-user interface (GUI) and browser functions, directing security functions, directing calculations such as calculation of the objective functions for various limits, etc., for display and review by the user. Accordingly, host processor 210 may include a GUI 230 which may be embodied in software as a browser. Browsers are software devices which present an interface to, and interact with, users of the arrangement 1000. The browser is responsible for formatting and displaying user-interface components (e.g., hypertext, window, etc.) and pictures.

Browsers are typically controlled and commanded by the standard hypertext mark-up language (HTML). Additionally, or in the alternative, any decisions in control flow of the GUI 230 that require more detailed user interaction may be implemented using JavaScript. Both of these languages may be customized or adapted for the specific details of a given application server 200 implementation, and images may be displayed in the browser using well known JPG, GIF, TIFF and other standardized compression schemes, other non-standardized languages and compression schemes may be used for the GUI 230, such as XML, "home-brew" languages or other known non-standardized languages and schemes. Host processor 210 may be operatively connected to a cryptographic server 260. Accordingly, application server 200 implements all security functions by using the cryptographic server 260, so as to establish a firewall to protect the arrangement 1000 from outside security breaches. Further, cryptographic server 260 secures all personal information of registered users.

Application server 200 may be also operatively connected to a plurality of calculation servers 400. The calculation servers 400 may perform all the calculations required to process user entered data, direct simulation of a core design, calculate values for comparison as to be described in further detail below, and to provide results which may be displayed via, the GUI 230, under the direction of application server 200.

The calculation servers 400 may be embodied as WINDOWS 2000 servers, for example. More particularly, the calculation servers 400 may be configured to perform a multitude of complex computations which may include, but are not limited to, configuring the objective function and computing objective function values, executing a 3D simulator program to simulate reactor core operation on a particular core design and to generate outputs from the simulation, providing results data for access and display by a user via GUI 230, and iterating an optimization routine as to be described in further detail below.

Figure 3:
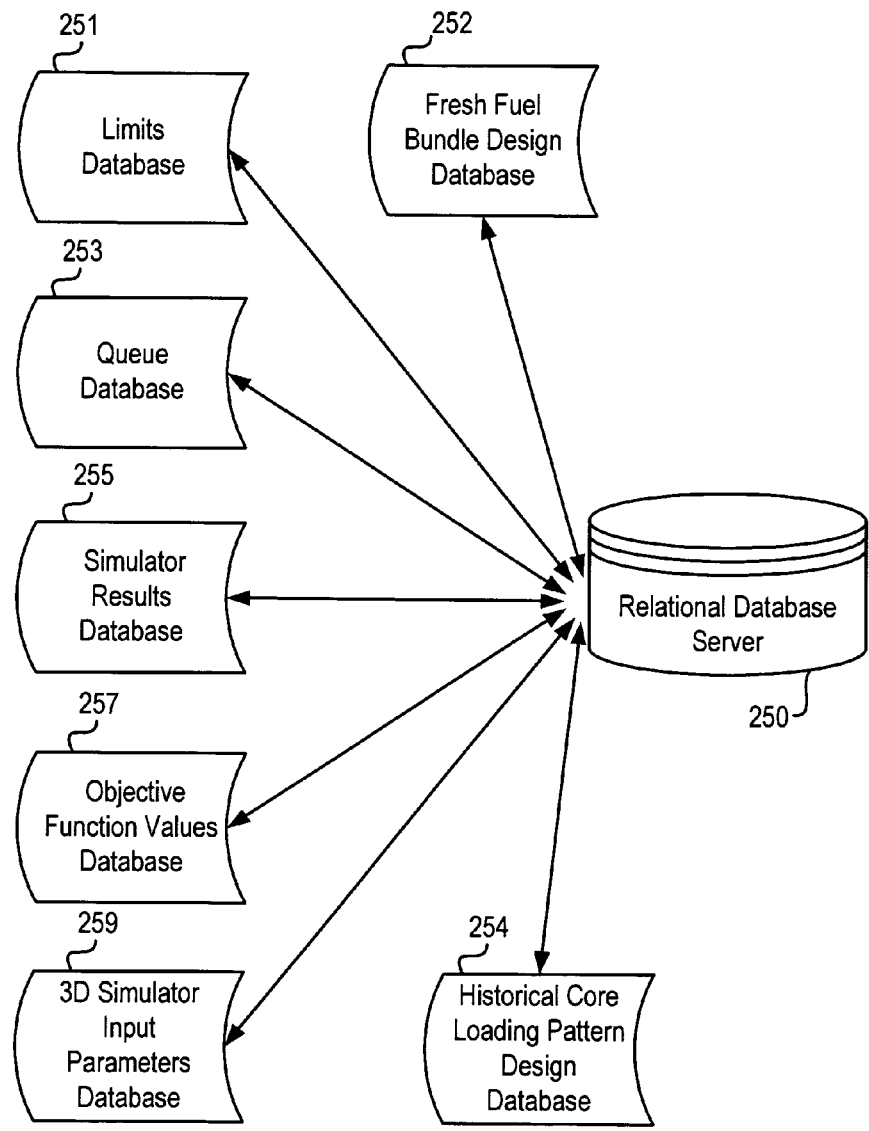
FIG. 3 illustrates a relational database having subordinate databases in accordance with an exemplary embodiment of the invention.

FIG. 3 illustrates an exemplary database server 250 in accordance with an exemplary embodiment of the invention. Memory or database server 250 may be a relational database such as an Oracle 8i Alpha ES 40 relational database server. Relational database server 250 may contain a number of subordinate databases that handle all the necessary data and results in order to implement the method of the present invention. For example, relational database server 250 may include storage areas which contain subordinate databases such as limits database 251, which is a database that stores all the user input limits and/or design constraints for all core designs that are evaluated for a particular nuclear reactor. There may also be a fresh fuel bundle design database 252 which may include a palette of a wide variety of fresh fuel bundle designs ("N streams") that have been previously created and modeled.

Additionally, relational database server 250 may include a queue database 253, which stores all parameters for a core design that are to be simulated in the 3D simulator, and a historical core loading pattern design database 254, which includes historical reactor core designs that may be selected in generating a reference core design that is most consistent with defined limits. All simulator results may be stored in simulator results database 255. The simulator results database 255 (and limits database 251) may be accessed by the calculation servers 400 in order to calculate a number of objective function values that are applicable to a particular core design. These objective function values may be stored in an objective function values database 257 within relational database server 250. A 3D simulator input parameters database 259 may also be included within relational database server 250. Database 259 may include the positions of control blades and reactor operating parameters for all exposure steps. As the calculation servers 400 is operatively connected to, and may communicate with, relational database server 250, each of the subordinate databases described in FIG. 3 may be accessible to one or more calculation servers 400.

Figure 4:
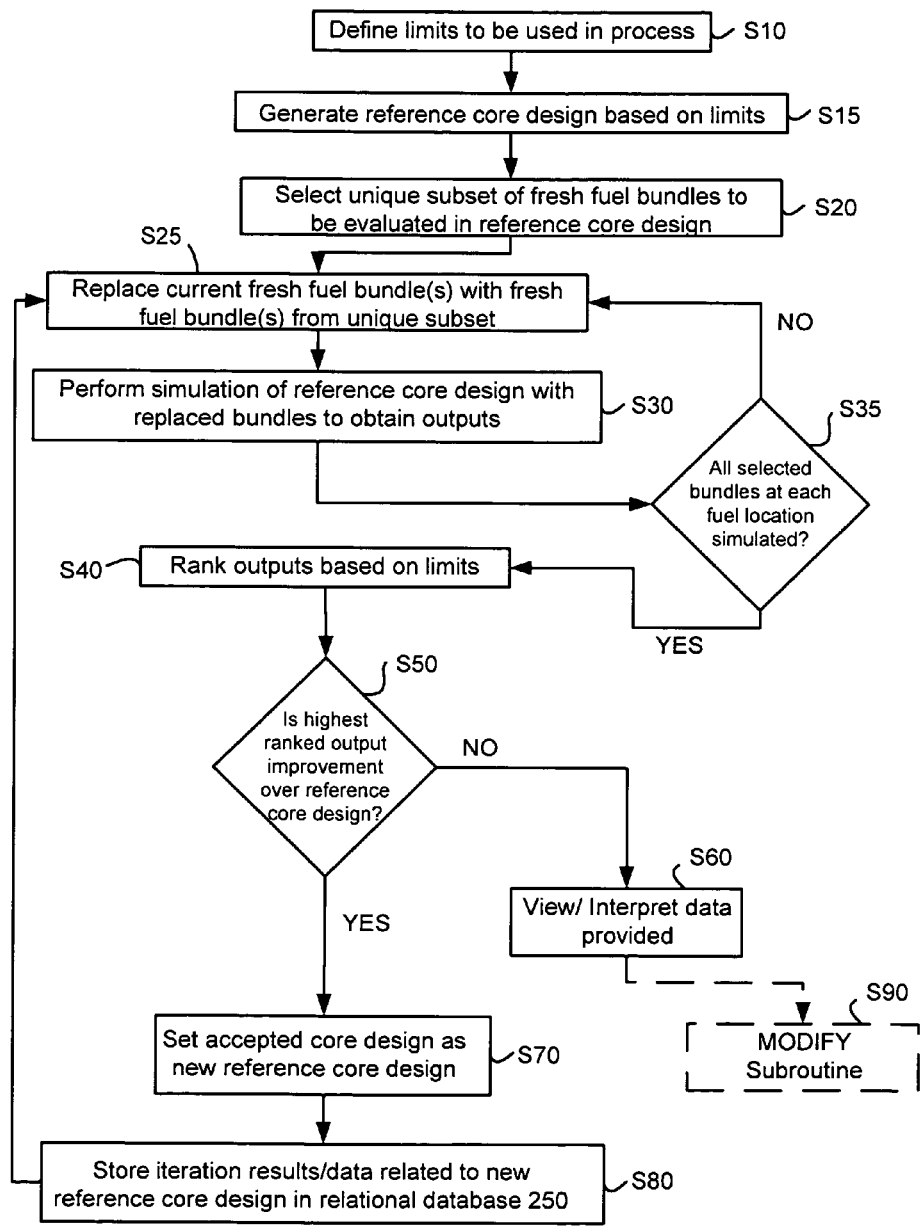
FIG. 4 is a flow chart describing the method in accordance with an exemplary embodiment of the invention.

FIG. 4 is a flow chart illustrating the method in accordance with an exemplary embodiment of the invention which is described in terms of a core loading pattern design for an exemplary boiling water reactor, it being understood that the method and arrangement are applicable to PWRs, gas-cooled reactors and heavy-water reactors. FIGS. 8–14 are screen shots describing an exemplary computer-based application to further describe various features of the method and arrangement of the present invention. These figures may be occasionally referred to in the following description of the inventive method and arrangement.

In general in the method, all limits (which may include anything a customer, designer or user indicates is critical to a particular desired core design) should be understood and incorporated into a reference core design. Initial fresh fuel types and loading pattern for the reference core design may be determined based on an estimate from historical, similar cycles for example. An iterative process of improvement may then be performed on the reference core design. Results from each iteration may be viewed, if desired, and a user may determine whether the limits were met and if maximum energy output was obtained. If the results of the iterative improvement process are satisfactory, a report may be generated and provided to a customer. If the results are not satisfactory (e.g., even after the iterative process is performed, an acceptable core design solution has not been determined) a designer or user may determine modifications to be made to the reference core design (i.e., new fresh fuel loading pattern, including the introduction of additional fresh bundles, etc.). The iterative improvement process may then be repeated, as to be described in further detail below, until a satisfactory result is obtained. In an aspect, the method and arrangement utilize a GUI that enables rapid viewing of results at each process step, as stored and retrieved from one or more of the databases in the relational database server 250.

Referring now to FIG. 4, initially, a reactor plant is selected (Step S5) so that a reference core design and initial fresh fuel loading pattern may be chosen. The reactor plant may be selected from a stored list, such as is stored on an accessible database such as relational database 250 for example. The reactor to be evaluated may be any of a BWR, PWR, gas-cooled reactor or heavy water reactor, for example. Data from previously evaluated plants may be stored, and the plant listed under a suitable accessible folder such as may be accessed via a suitable input device (mouse, keyboard, plasma touch screen, etc.) and GUI 230.

Limits which are to used in a simulation for core design of the selected plant are defined (Step S10). These limits may be related to key aspects of the design of the particular reactor being evaluated and design constraints of that reactor. The limits may be applicable to variables that are to be input for performing a simulation of the reference core design, and may be limit applicable only to the results of the simulation (e.g., on the outputs). For example, the input limits may be related to client-inputted reactor plant specific constraints and core performance criteria (e.g., energy content). Limits applicable to outputs from simulation may be related to one or more of operational parameter limits used for reactor operation, core safety limits, margins to these operational and safety limits and the other client-inputted reactor plant specific constraints.

Figure 8:
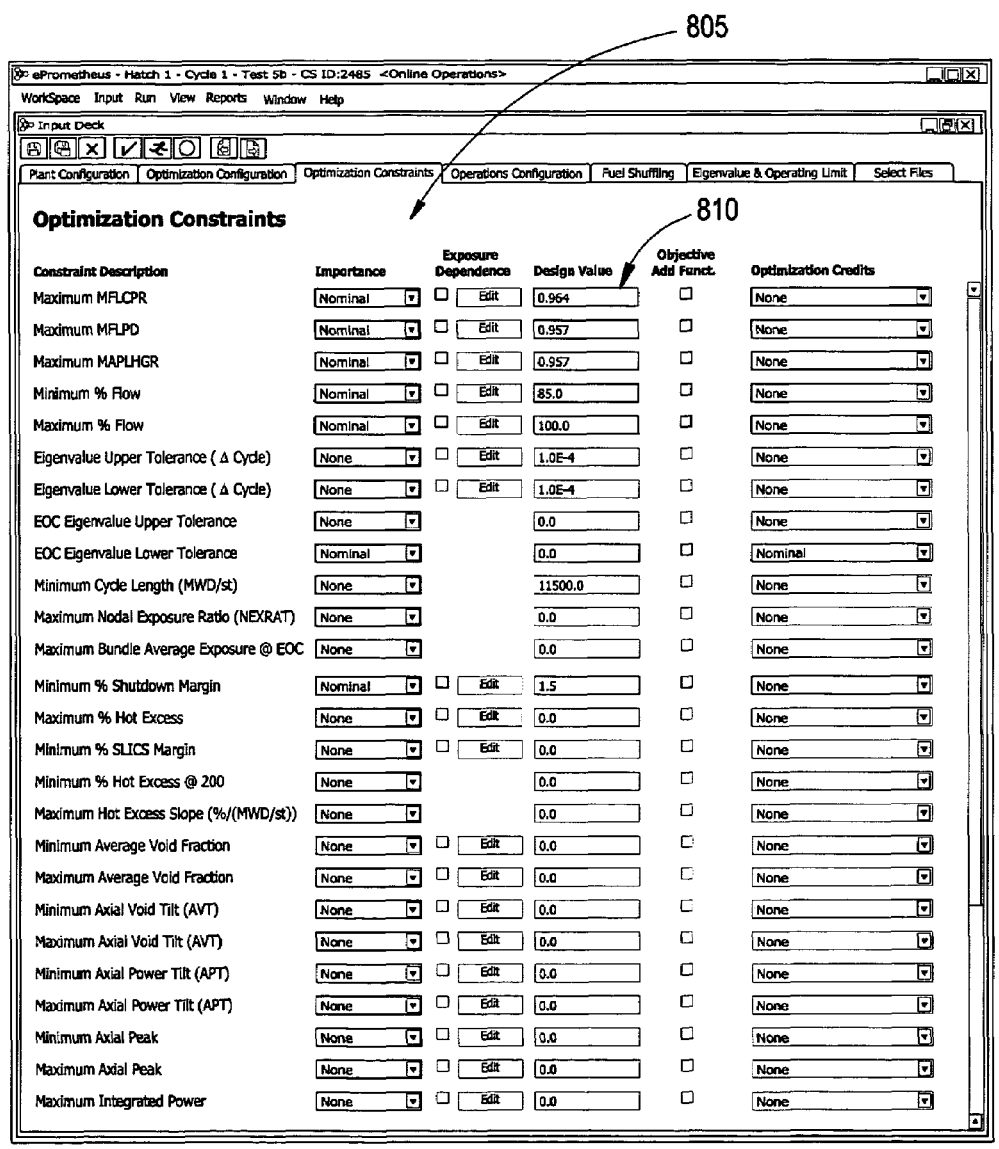

FIG. 8 illustrates client-inputted plant specific constraints, which may be configured as limits on input variables to the simulation and limits on the simulation results. Referring to FIG. 8, there is listed a plurality of client-inputted plant specific constraints as indicated generally by the arrow 805. For each constraint, it is possible to assign a design value limit, as indicated by column 810.

A reference core design with initial fresh fuel loading pattern is generated (Step S15) for the selected reactor. For example, historical core loading pattern design database 254 may be accessed to find a historical reactor core design most consistent with the defined limits. A historical core design may be consistent if it is of a similar core size and power output rating, has similar cycle energy, and has similar operational performance characteristics to the core design being developed for the selected reactor plant. Using the similar historical design as a basis, the total energy content of the historical core may be calculated and a difference from the required energy content (e.g., the desired energy output from the determined core design, as based on customer requirements for example) defined. The difference in energy between historical core energy content and the energy content desired should be supplied by the loading of fresh fuel assemblies.

Thus, to generate the reference core design, the user should select (Step S20) fresh fuel bundle type(s) for the reference core design that can best meet the energy requirement(s) (which may be included in the limits) for the reactor core design to be developed. The bundles designs may be selected from fresh fuel bundle design database 252, which provides a wide variety of fresh fuel bundle designs (or N streams) that have been previously created and modeled.

Figure 9:
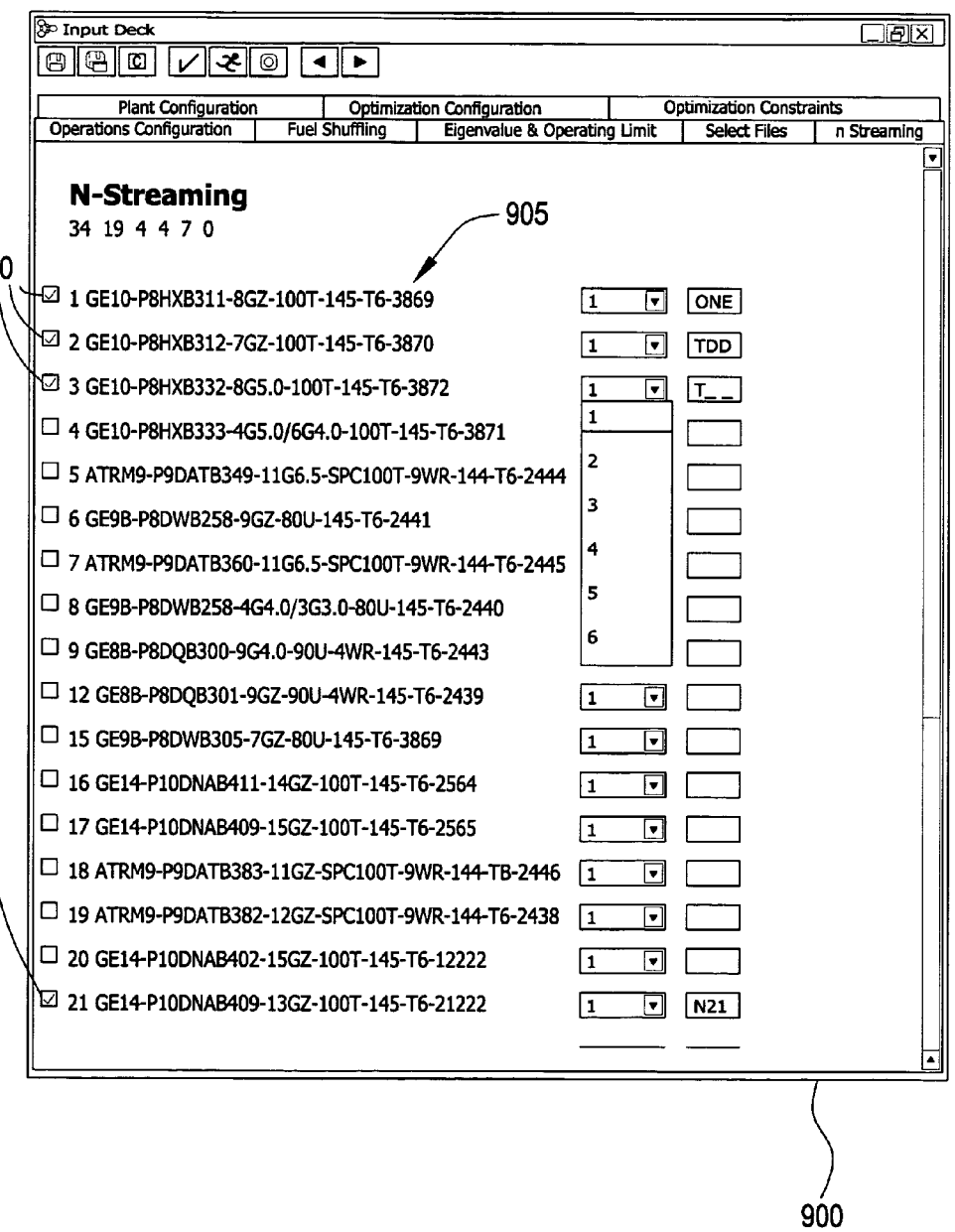

FIG. 9 illustrates a screen shot of a bundle selection web page 900. Entitled "N-Streaming", a user may bring up page 900 via GUI 230 using a suitable input device, such as a modem, keyboard, pointer and the like. A plurality of selectable fresh fuel bundle types 905 may displayed; these bundle types 905 have been previously modeled, so information relating to the performance of these bundle types 905 is readily available to the user. The user may then select desired bundle types to be used in the loading pattern of the reference core design by checking boxes 910.

With the fresh bundle types selected, core loading symmetries should be accounted for, with some plants requiring octant, quadrant, or half-core loading symmetry. This may be done by clicking on a suitable drop down menu and the like. By selecting octant symmetry, the user may model the reactor assuming that all 8 octants (where an octant is a group of fuel bundles for example) are similar to a modeled octant of fuel assemblies. Consequently, simulator time is generally increased by a factor of eight. Similarly, by selecting "quadrant symmetry", the user can model the reactor assuming each of the 4 quadrants are similar to the modeled quadrant. Hence, simulator time is generally increased by a factor of four. If asymmetries in bundle properties prevent octant or quadrant symmetry, the user can also specify no symmetry. The core is thus loaded accounting for symmetries and the defined limits.

One or more current fresh fuel bundles in the reference core design may then be replaced (Step S25) with one or more of the selectable fresh fuel bundles 905 during an iterative improvement process. The selection may be performed via GUI 230, which provides the user with a summary of each bundle's performance characteristics. Once the "N-streaming" (selected fresh fuel bundles) have been defined, a looping process described in terms of Steps S25 and S30 is initiated, whereby a systematic process of replacement and analysis for fresh fuel bundles is performed.

At an outermost level ("outer loop") each fresh fuel location in the current reference core design is examined in sequence. By "examined", reactor core operation is simulated (Step S30) for the reference core design with each particular loading pattern, and performance characteristics of the bundle are reviewed to determine whether a reference core design that can best meet the energy requirement(s) (which may be included in the limits) for the reactor core design has to be developed. At the innermost level, each "replacement" fresh fuel bundle 905 selected from page 900 is examined in each fuel location. During this process, a current fresh fuel bundle in the reference core design is replaced with each new "N-streaming" fresh fuel bundle 905.

Reactor operation may be simulated (Step S30) on the reference core design containing one or more of the select fresh fuel bundles, in order to produce a plurality of simulated results, or outputs. The simulation may be executed by calculation servers 400; however, the simulation may be a 3D simulation process that is run external to the arrangement 1000. The user may employ well-known executable 3D simulator programs such as PANACEA, LOGOS, SIMULATE, POLCA, or any other known simulator software where the appropriate simulator drivers have been defined and coded, as is known. The calculation servers 400 may execute these simulator programs based on input by the user via GUI 230.

Thus, the user may initiate a 3D simulation at any time using GUI 230, and may have a number and different means to initiate a simulation. For example, the user may select a "run simulation" from a window drop down menu, or could click on a "RUN" icon on a webpage task bar, as is known. Additionally, the user may receive graphical updates or status of the simulation. Data related to the simulation may be queued in queue database 253 within relational database server 250. Once the simulation is queued, the user may have an audio and/or visual indication as to when the simulation is complete, as is known. The iterative steps of replacement and simulation are repeated (output of Step S35 is NO) until all selected fresh fuel bundles have been inserted at each fuel location and each "derivative" reference core design has been simulated (e.g., output of Step S35 is YES). Substitution of all selected fresh fuel bundles 905 into each of the fresh fuel locations is therefore complete upon exiting the inner and outer loops.

The iterative improvement process described above is beneficial in that it enables the user to fine tune a core design, and to perhaps extract even more energy out of an acceptable core design than was previously possible of doing with the conventional, manual iterative process. Further, incorporation of the relational database server 250 and a number of calculation servers 400 expedite calculations. The iterative improvement process as described in FIG. 4 may be done in an extremely short period of time, as compared to a number of weeks using the prior art manual iterative process of changing one parameter at a time, and then running a reactor core simulation.

The outputs from simulation are ranked based on the limits (Step S40). A user may display data related to each of the outputs, if desired. This enables a user to make a comparison against the reference core design to determine whether there was any improvement, where improvement may be defined in terms of not exceeding the defined limits, or meeting certain energy requirements, for example.

If the top ranked output is an improvement (output of Step S50 is YES) the core design corresponding to that highest ranked output is set (Step S70) as the new reference core design with the results stored (Step S80) in relational database server 250, such as in simulator results database 255. This completes one iteration of the iterative improvement process. Steps S25, S27, S30, S40 and S50 are repeated (e.g., N iterations), with each "improvement" becoming the new reference core design for a subsequent iteration. The defined limits are applicable to the reference core design in each of the N iterations. If, for a given iteration, there is no improvement in the top ranked output, the iterative process is complete, and data relating to the reference core design at that point, since it is the top ranked design may be displayed and interpreted (Step S60) by the user. The data may also provide the user with an indication of which location in a simulated core were the largest violators or largest contributors to a limit violation. At Step S60, the user may be inclined to initiate a modify subroutine (Step S90). This is an optional step which typically is required only if the above iterative improvement process fails to determine a core design that is acceptable to the user. The modify subroutine will be described in further detail below.

FIG. 5 is a flow chart illustrating a simulation step in accordance with an exemplary embodiment of the invention. Once the user initiates simulation, many automation steps follow. Initially, all definitions for the core design problem are converted into a 3D instruction set (e.g., a computer job) for a 3D reactor core simulator (Step S31). This enables the user to have a choice of several types of simulators, such as the simulators described above. Selection of a particular simulator may be dependant on the plant criteria entered by the user (e.g. the limits). The computer job is readied for queuing in the queue database 253 of each relational database server 250 (Step S33). The storing of the data for a particular simulation enables any potential simulation iteration to start from the last or previous iteration. By storing and retrieving this data, future simulation iterations to a core design take only minutes or seconds to perform.

Concurrently, a program running on each of the available calculation servers 400 scans every few seconds to look for available jobs to run (Step S37). If a job is ready to run, one or more of the calculation servers 400 obtains the data from the queue database 253 and runs the appropriate 3D simulator. As described above, one or more status messages may be displayed to the user. Upon completion of the simulation, all results of interest may be stored in one or more subordinate databases within the relational database server 250 (e.g., simulation results database 255). Accordingly, the relational database server 250 may be accessed in order to calculate the objective function values for the test core design.

FIG. 6 is a flow diagram illustrating the ranking step of FIG. 4 in further detail. In ranking the outputs, an objective function is calculated in order to compare how closely a simulated core design meets the limits or constraints. An objective function is a mathematical equation that incorporates the constraints or limits and quantifies the core design's adherence to the limits. For example, based upon the results of the simulation and the calculated objection function values, the user, who may be a core designer, engineer or plant supervisor for example, is able to determine if a particular design meets the user's limit requirements (i.e., meets a maximum cycle energy requirement).

The objective function may be stored in relational database server 250 for access by calculation servers 400. Objective function calculations, which provide objective functions values, may also be stored in the relational database server 250, such as in a subordinate objective function value database 257. Referring to FIG. 6, inputs to the objective function calculation include the limits from the limits database 257 and the simulator results from the simulator results database 255. Accordingly, one or more calculation servers 400 access this data from relational database server 250 (Step S41).

Although the method and arrangement of the present invention envision any number of objection function formats that could be utilized, one embodiment includes an objective function having three components: (a) the limit for a particular constraint parameter (e.g., design constraint for reactor plant parameter), represented as "CONS"; the simulation result from the 3D simulator for that particular constraint parameter, represented as "RESULT", and a multiplier for the constraint parameter, represented by "MULT". A set of predefined MULTs may be empirically determined from a large collection of BWR plant configurations, for example. These multipliers may be set at values that enable reactor energy, reactivity limits, and thermal limits to be determined in an appropriate order. Accordingly, the method of the present invention utilizes a generic set of empirically-determined multipliers, which may be applied to over thirty different core designs. However, GUI 230 permits manual changing of the multipliers, which is significant in that user preference may desire certain constraints to be "penalized" with greater multipliers than the multipliers identified by the preset defaults.

An objective function value may be calculated for each individual constraint parameter, and for all constraint parameters as a whole, where all constraint parameters represent the entity of what is being evaluated in a particular core. An individual constraint component of the objective function may be calculated as described in Equation (1):

$$OBJ_{par} = MULT_{par} * (RESULT_{par} - CONS_{par}); \qquad (1)$$

where "par" may be any of the client-inputted constraints listed in FIG. 8. It is to be understood that these parameters are not the only parameters that could be possible candidates for evaluation, but are parameters which are commonly used in order to determine a suitable core configuration for a nuclear reactor. The total objective function may be a summation of all constraint parameters, or $$OBJ_{TOT} = SUM(par=1,31)\{OBJ_{par}\} \qquad (2)$$

Referring to Equation 1, if RESULT is less than CONS (e.g. there is no violation of a constraint), the difference is reset to zero and the objective function will be zero. Accordingly, objective function values of zero indicate that a particular constraint has not been violated. Positive values of the objective function represent violations that may require correction. Additionally, the simulation results may be provided in the form of special coordinates (i, j, k) and time coordinates (exposure step) (e.g., particular time in a core-energy cycle). Therefore, the user can see at which time coordinate (e.g., exposure step) the problem is located. Hence, the core is modified only at the identified exposure step.

In addition, objective function values may be calculated as a function of each exposure step, and totaled for the entire core design problem (Step S43). The objective function values calculated for each constraint, and the objective function values per exposure step, may be further examined by normalizing each objective function value to provide a percentage contribution of a given constraint to a total objective function value (Step S45). Each result or value of an objective function calculation is stored in a subordinate objective function value database 257 within relational database server 250.

The objective function values may be utilized in the manual determination of core development. For example, the values of the objective function calculations may be viewed graphically by the user in order to determine parameters that violate limits. Additionally, any change in objective function values over successful iterations of core design provides the user with a gauge to estimate both improvement and detriment in their proposed design.

Increases in an objective function value over several iterations indicate that the user's changes are creating a core design that is moving away from a desired solution, while successive iterations of lesser objective functions values (e.g., the objective function value decreasing from a positive value towards zero) may indicate improvements in the iterative core design. The objective function values, limits and simulation results over successive iterations may be stored in various subordinate databases within relational database server 250. Therefore, designs from past iterations may be quickly retrieved, should later modifications prove unhelpful.

Figure 10:
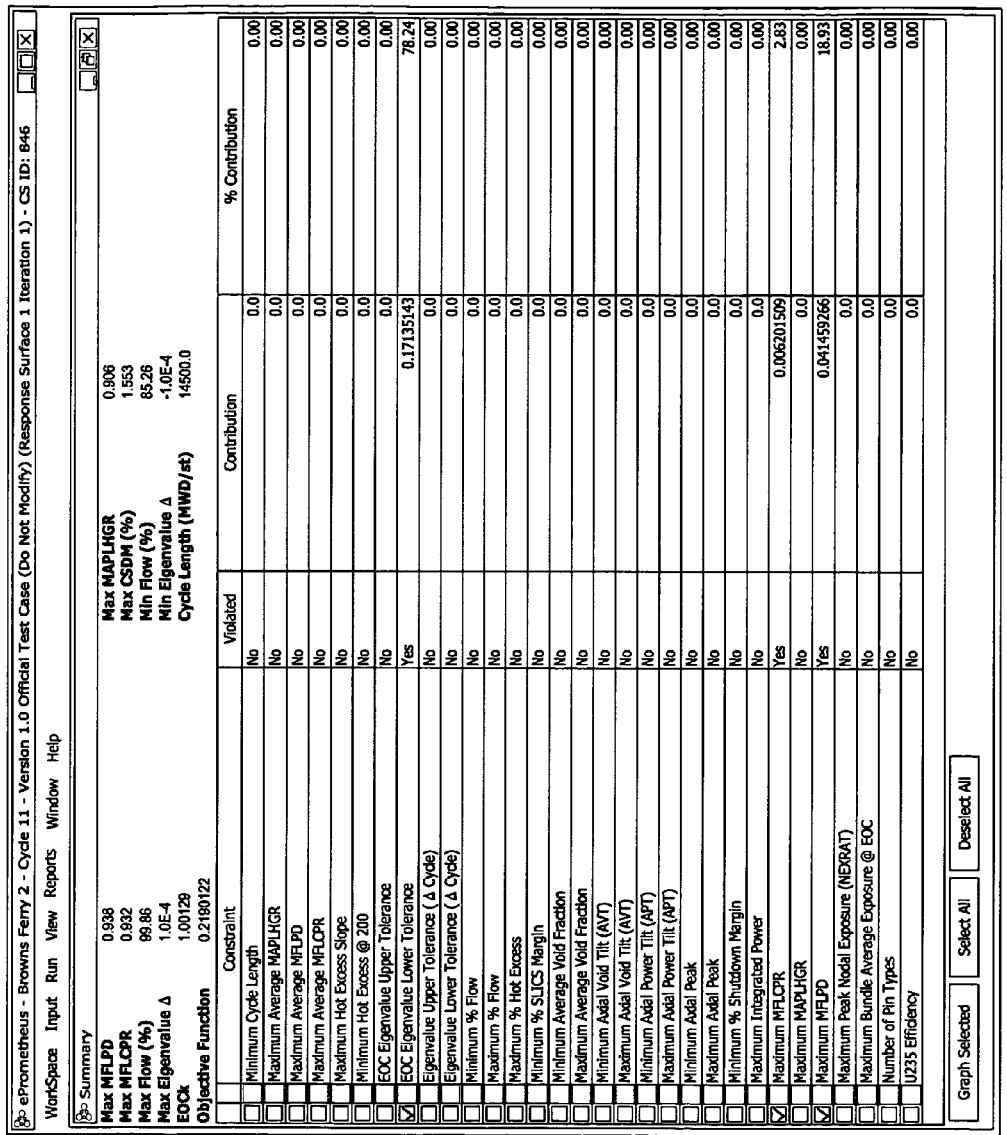

Upon completion of the objective function calculation, the user may be provided with data related to the objective function calculations, which may include limits that have been violated during the simulation of an evaluated core design. FIG. 10 illustrates exemplary graphical data which a user may review. This data may be displayed by the user after each iteration, if desired. Referring to FIG. 10, there is displayed a list of constraint parameters which may represent the input limits, and the values of each of objective function value calculation on a per constraint basis. FIG. 10 illustrates limits which have been violated with a check in a box, as indicated by checked box 1005 for example. Additionally, for each limit violation, its contribution and percent (%) contribution (based on the calculations and the normalization routines described with respect to FIG. 6), are displayed. Accordingly, based on this data, the user may be provided with a recommendation as to what modifications need to be made to the core design, if any, for a subsequent iteration.

Although the individual core modifications may alternatively be left to the desires of the user, procedural recommendations may be provided in the form of a pull down menu, for example. These recommendations may be divided into three categories: energy beneficial moves, energy detrimental moves, and converting excessive margin (from thermal limit) into additional energy. A preferred technique is to address problems using energy beneficial moves rather than energy detrimental moves. Even if the core design meets all of the limits (client-inputted plant specific constraints, design limits, thermal limits,.etc.) the user may verify that any excessive margin to a particular limit is converted into additional energy. Accordingly, the following logic statements may represent the above procedural recommendations:

Energy Beneficial Moves
   If Critical Power Ratio (CPR) margin is too low towards core perimeter, bring more reactive fuel toward core center
   If NEXRAT (Nodal Exposure Ratio, a thermal margin constraint) problem at end-of-cycle (EOC), move more reactive (e.g., less exposed) fuel to problem location;
   If ShutDown Margin (SDM) problem at perimeter of core at beginning of cycle (BOC), place less reactive fuel towards perimeter Energy Detrimental Moves
   If CPR margin too low at EOC, move less reactive fuel into problem location
   If kW/ft margin too low at EOC, move less reactive fuel into problem location Converting Excessive Margin into Additional Energy
   If extra CPR margin in center of core at EOC, move more reactive fuel from perimeter locations to core center Based on the location, and on the time exposure of limit violations, as indicated by the objective function, a user may easily follow one or more of the above recommendations to address and fix constraint violations.

The data resulting from the objective function calculations may be interpreted on a suitable display device. For example, this data may be displayed as a list of constraints with denoted violators, as described with respect to FIG. 10. However, the user may access a number of different "result" display screens that may be configurable as 2- or 3-dimensional views, for example. The following Table 1 lists some of the exemplary views available to the user.

TABLE 1

| GRAPHICAL VIEWS AVAILABLE TO USER |
| --- |
| Objective function results - listing |
| Graph of max core value vs. exposure |
| Graph of nodal maximum value vs. exposure |
| Graph of location of max core value vs. exposure |
| Graph of pin value vs. exposure |
| Graph of bundle maximum value vs. exposure |
| View 3D rotational diagram |
| Report performance relative to previous iteration |
| Report improvement rates of various designers |
| Display of server status |
| Display of queue status |
| Display system recommendations |

Figure 11A:
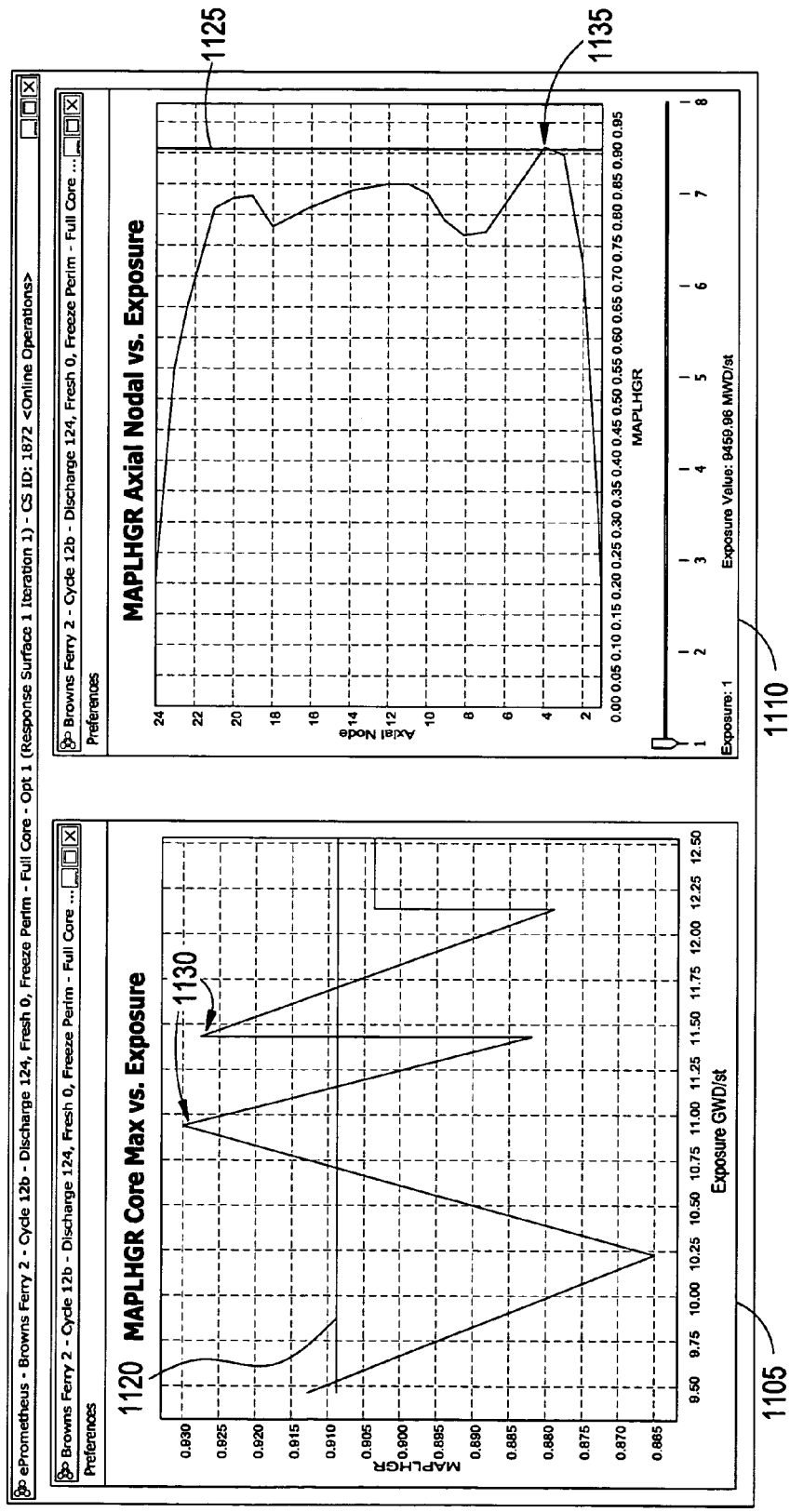
Figure 11B:
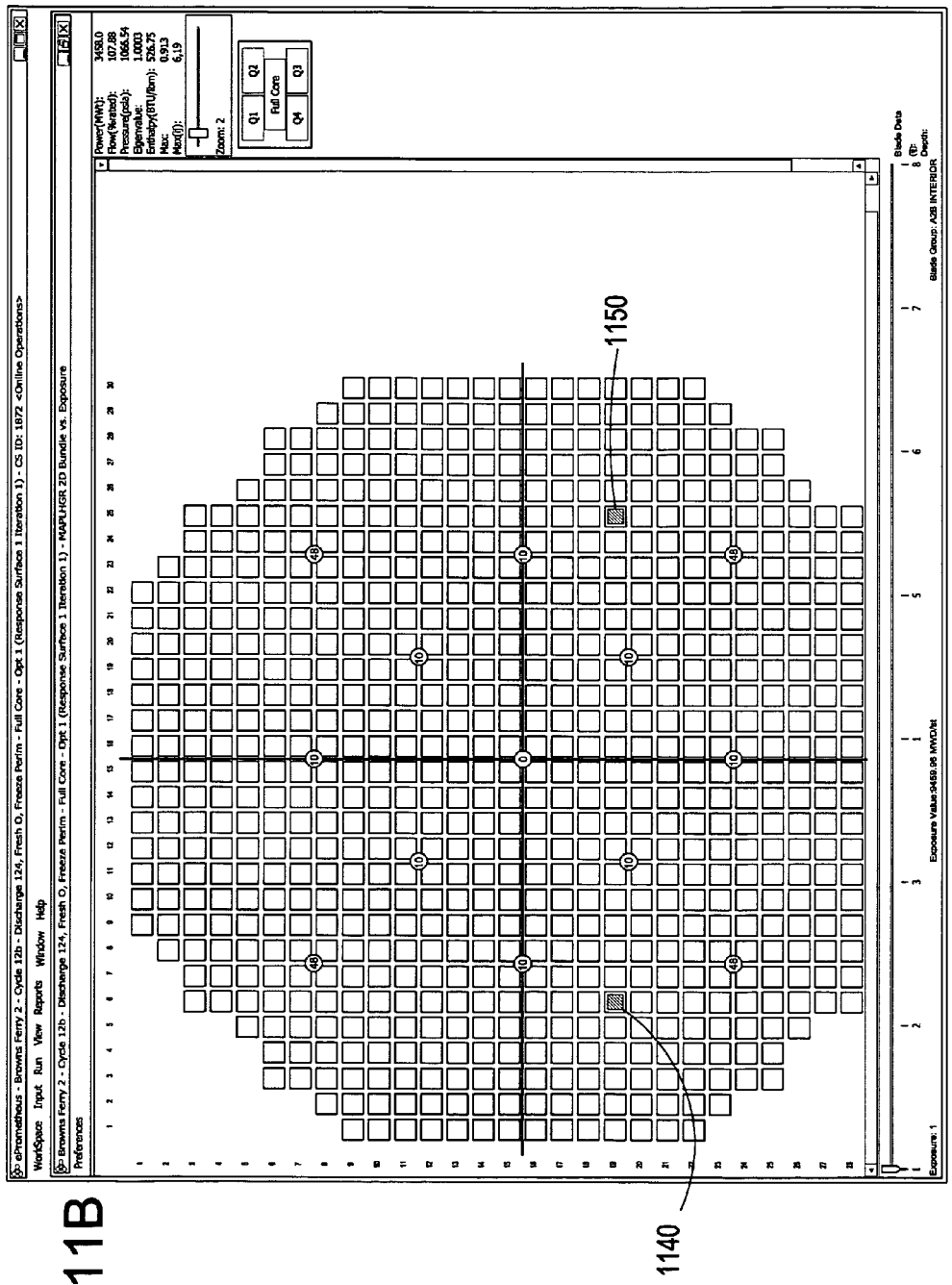

FIGS. 11A and 11B illustrate graphical views available to the user in accordance with the invention. A user may pull down a suitable drop down menu from a "view" icon on a task bar in order to display views of certain constraints or parameters. The user simply selects the desired view and may then access a page such as is illustrated in FIGS. 11A or 11B. FIG. 11A illustrates two different 2-dimensional graphs of particular constraints, as seen at 1105 and 1110. For example, the user can determine where violations of Maximum Average Planar Heat Generation Rate (MAPLHGR) occur (in a core maximum vs. exposure graph 1105, and an axial values of MFLPD vs. exposure graph 1110) for a particular exposure in a core cycle. The limits for these constraints are shown by lines 1120 and 1125, with violations shown generally at 1130 and 1135 in FIG. 11A.

FIG. 11B illustrates another view, in this case a two dimensional view of an entire cross section of a core, in order to see where the biggest violation contributors for MAPLHGR vs. exposure are located. As can be seen at 1140 and 1150, the encircled squares represent fuel bundles that are the largest violation contributors to MAPLHGR in the core (e.g., 1140 and 1150 pointing to bundles violating MAPLHGR). This gives the user an indication of where the core design may need modification.

Figure 7A:
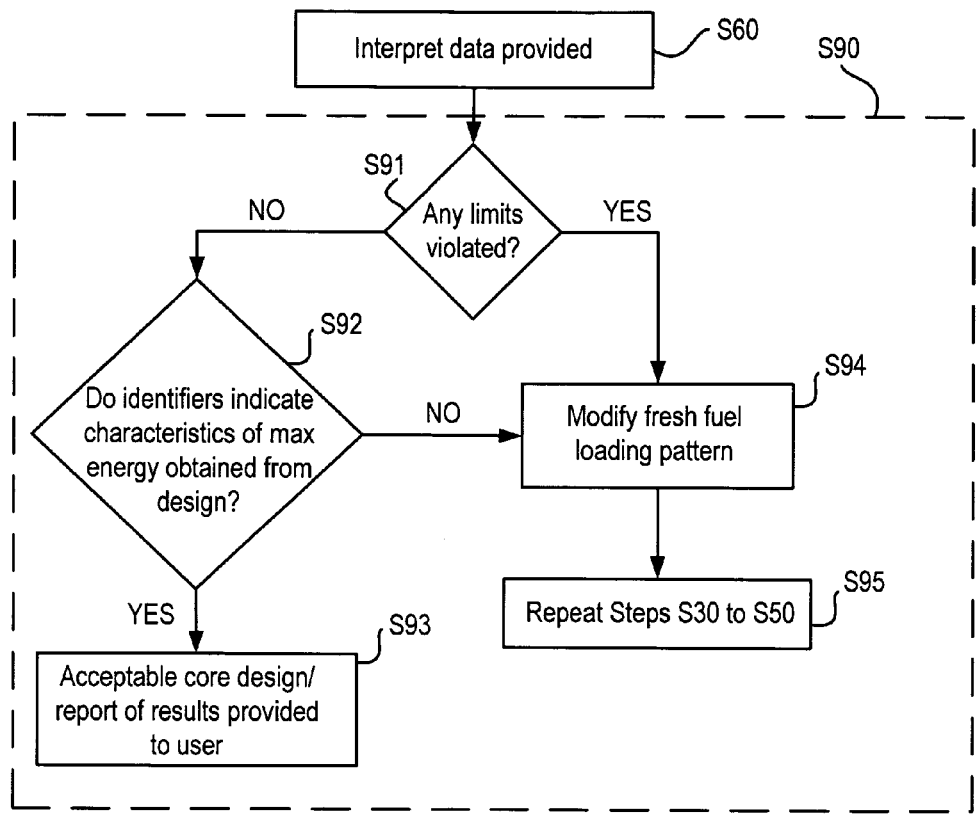
FIGS. 7A and 7B are flow charts illustrating the modification of an accepted core design in accordance with an exemplary embodiment of the invention.
Figure 7B:
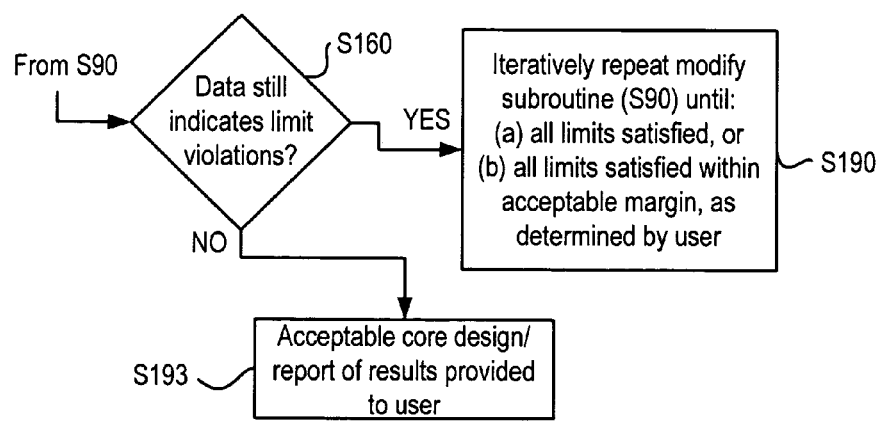

FIGS. 7A and 7B are flow diagrams describing a modify subroutine in accordance with an exemplary embodiment of the invention. Referring to FIG. 7A, by interpreting the data at Step S60, the user may be inclined to initiate a modify subroutine (Step S90). In such a case practicality, the original reference core design will not be an acceptable design, and a modify subroutine may be required if the iterative improvement process fails to provide a core design that is acceptable to the user, such as may be the case where certain limits which shall not be violated are still violated with each iteration..

In one embodiment, the user can manually direct this modifying subroutine, with the help of GUI 230. In another embodiment, the subroutine may be performed within the bounds of an optimization algorithm that automatically iterates modifying of the reference core design, simulation, calculation of objective function and evaluation of the results or values of the objective function calculations for a number of core design iterations.

The user determines, based on the displayed data, whether any limits are violated (Step S91). If no limits are violated, the user determines if any identifiers indicate that characteristics of maximum energy are obtained from the core design. For example, these identifiers may include an indication of good thermal margin utilization (such as margins on MFLCPR and LHGR) by moving fuel so as to maximize plutonium generation for cycle extension. Energy requirements may be shown to be met when the minimum EOC eigenvalue is obtained for the core design to be used for the fuel cycle (eigenvalue search) or the desired cycle length is determined at a fixed EOC eigenvalue. If there is an indication that maximum energy has been obtained from a core design (the output of Step S92 is YES), an acceptable core design has been determined, and the user may access a report of the results related to the core design (Step S93).

If limits are violated (the output of Step S91 is YES) or limits are not violated but there is an indication that maximum energy has not been obtained from the core design (the output Step S92 is NO) then the user determines a fresh fuel loading pattern modification to be made to the current reference core design (Step S94). This is where the user may either make individual core modifications, or use the system-provided procedural recommendations described above (energy beneficial moves, energy detrimental moves, and converting excessive margin (from thermal limit) into additional energy) by accessing a pull down menu, for example. Additionally, if several iterations of core design changes have been attempted and there has been no real improvement to the objective function, this is a further indication that an alternative core design with a different fresh fuel loading pattern might need to be explored.

In making a modification to the fresh fuel loading pattern, and based on the recommendations from above, the user may alter the fresh bundle loading via the GUI. For example, and using a suitable input device and GUI 230, a designer may identify the bundle symmetry option of any potential fresh bundle(s) in the reference core design to be moved, and may select the "target" fresh fuel bundle(s), the destination(s) where the target bundle(s) is/are to be moved. The identified target bundles are then "shuffled" according to the required symmetry (mirror, rotational, etc.). This process may be repeated for any fresh bundle shuffle that is required to re-load the core reference pattern in the desired manner.

Figure 12:
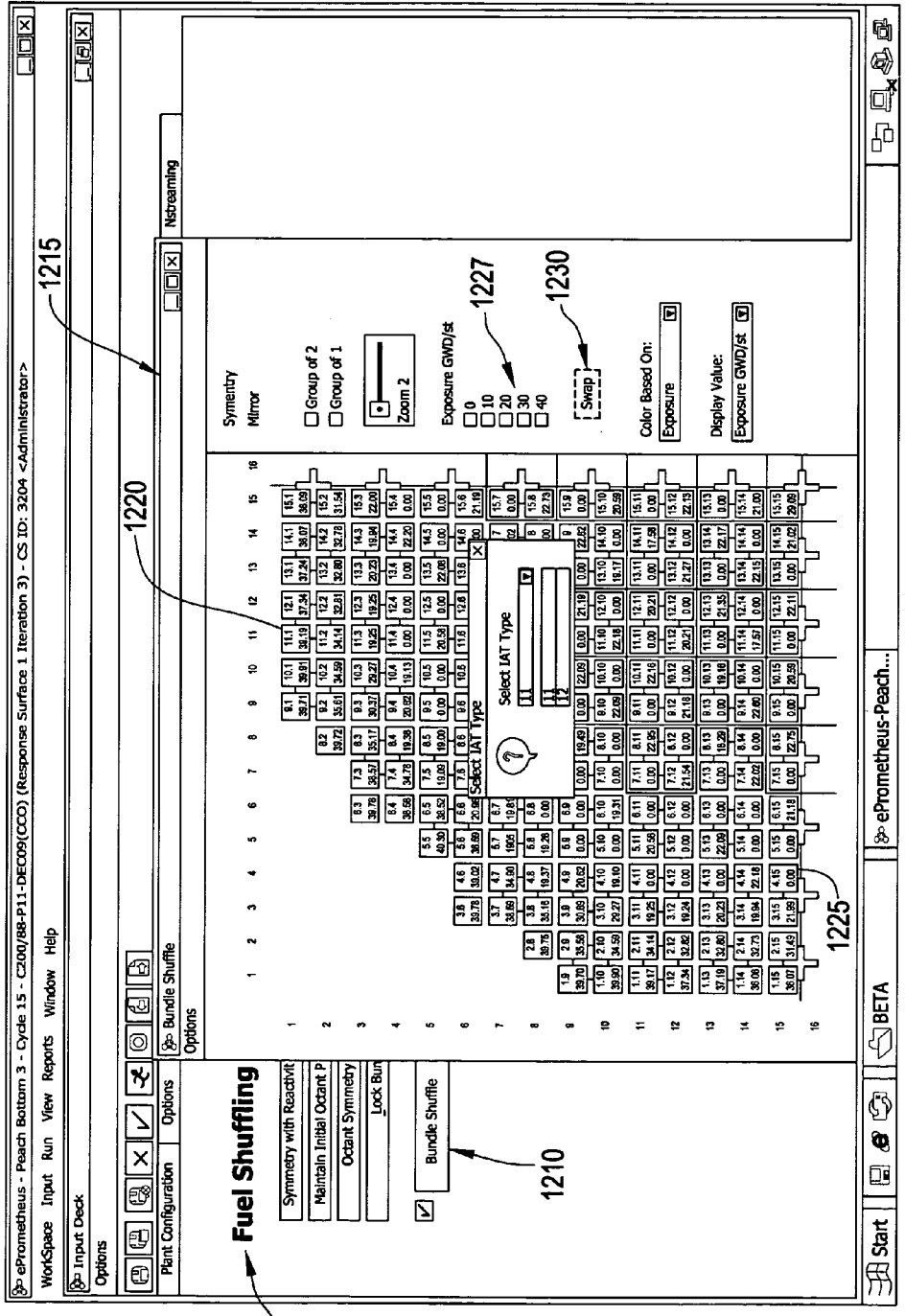

FIG. 12 is a screen shot illustrating the modifying step in further detail in accordance with an exemplary embodiment of the invention. FIG. 12 illustrates the functionality available to the user so as make swift design modifications to a reference core design. A user may select a fuel shuffling page 1205 and may select a "bundle shuffle" taskbar 1210 in order to display a screen 1215 of a portion of the reference core design. In FIG. 12, a fresh fuel bundle designated at 1220 is being changed from one fresh fuel bundle type (IAT type 11) to another (IAT type 12). An exposed bundle may be swapped (Step S94 in FIG. 7(a)) with a fresh fuel bundle by selecting a fresh fuel bundle in the core design, the exposed fuel bundle, and selecting the "SWAP" button 1230. The portion of the reference core shown in screen 1215 may be color coded to show the various exposures (GWD/st) of each of the fuel bundles. Such a color coding key may be displayed as indicated at 1227 for example. Selection of items in FIG. 12 may be effected by use of a suitable input device, such as a mouse, keyboard, touch screen, etc., as is known.

These reference core design modifications may be saved in relational database 250, such as in 3D Simulator input parameters database 259, for example. A user may repeat steps S30 to S50 (Step S95) incorporating the design modifications. The resultant highest ranked output establishes a new reference core design from which the iterative improvement process of FIG. 4 may be repeated. In other words, Steps S30–S50 may be repeated to determine if the derivative core design meets all limits (Step S95). This may become an iterative process, as described above.

FIG. 7B illustrates an iterative process in accordance with an exemplary embodiment of the invention. For each derivative core design from the modify subroutine of Step S95 that has been simulated, the user determines whether any data that is related to the ranking Step S40 (e.g., the calculated objective function values) still indicates that there are limit violations. If not, the user has developed an acceptable core design that may be used in a particular reactor, and may access graphical results related to the acceptable core design (Step S193).

If an iteration still indicates that limits are violated (the output of Step S160 is YES) then the modify subroutine in Step S90 is iteratively repeated until all limits are satisfied, or until all limits are satisfied within a margin that is acceptable, as determined by the user (Step S190). The iterative process is beneficial in that it enables the user to fine tune a core design, and to perhaps extract even more energy out of an acceptable core design than was previously possible of doing with the conventional, manual iterative process. Further, incorporation of the relational database server 250 and a number of calculation servers 400 expedite calculations. The iterative process as described in FIG. 7B may be done in an extremely short period of time, as compared to a number of weeks using the prior art manual iterative process of changing one parameter at a time, and then running a reactor core simulation.

To this point, the method and arrangement of the present invention have been described in terms of a user or designer interpreting data via GUI 230 and modifying a reference core design iteratively, by hand, based on displayed feedback (the data from the objective function) in order to get a desired design. However, the aforementioned steps of FIGS. 4, 7A and 7B may also be effectuated by way of an optimization process. The optimization process iterates the steps in FIGS. 4, 7A and 7B over a number of different core designs, constantly improving on violated limits in order to achieve an optimal core design to be used in a nuclear reactor core.

Figure 13:
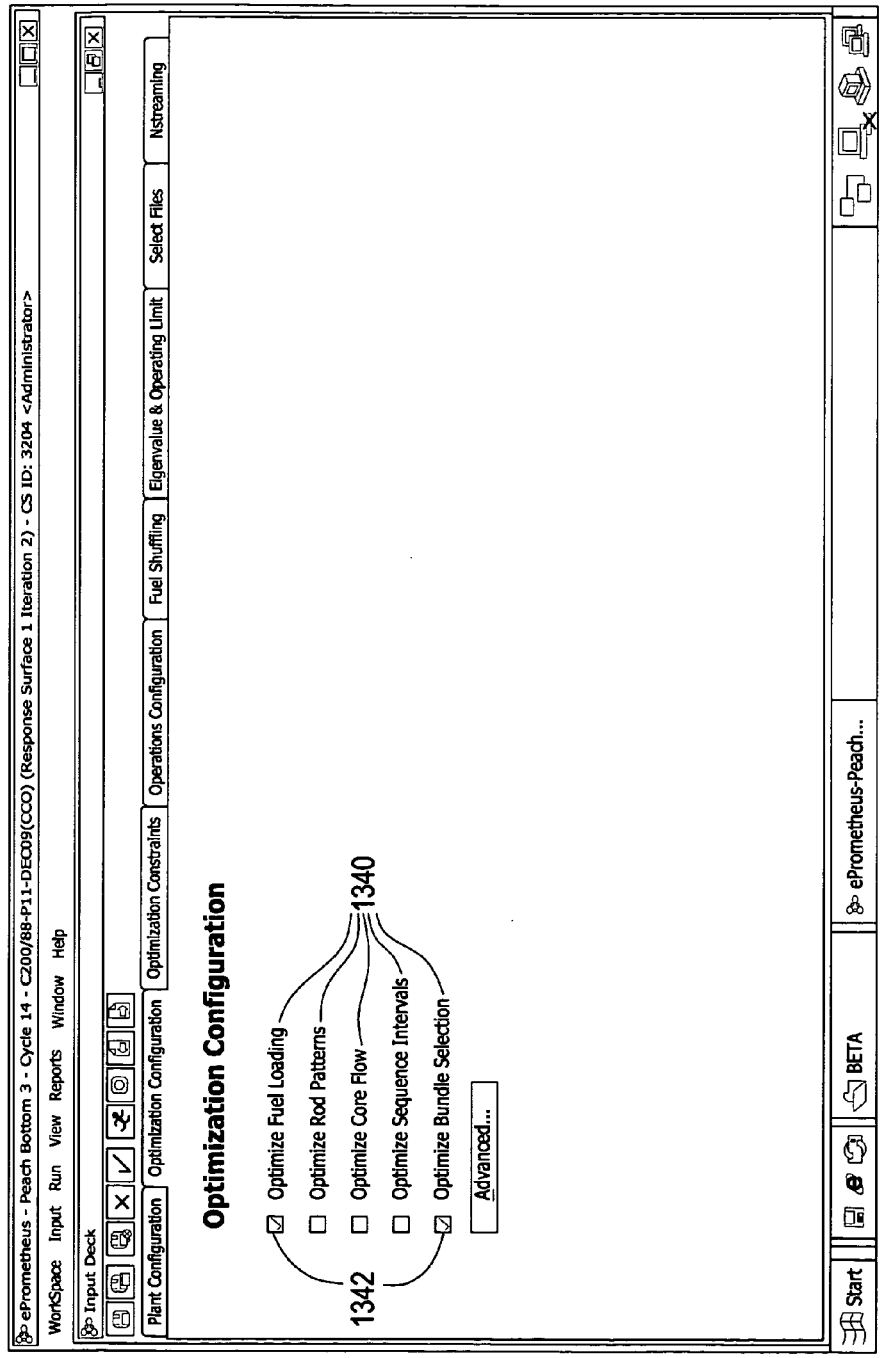

FIG. 13 illustrates a screen shot to initiate such a process. For example, after selecting the plant and generating a reference core design, the user may display an optimization configuration screen 1305. The user may select optimization parameters 1340 of optimize fuel loading, optimize rod patterns, optimize core flow, optimize sequence intervals and optimize bundle selection, for example.

Optimize bundle selection means making an optimal determination of fresh bundle types within the reference core design. As a result of the optimization, each fresh location may contain any one of a number of fresh bundle types (e.g., IAT types as shown in FIG. 12, for example) These types may be selected to maximize energy while satisfying constraints, as described above. Optimize rod patterns means to make an optimal determination on control blade (or control rod if PWR) position. Rod positions affect the local power as well as the nuclear reaction rate. Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence (i.e., control rod grouping) is used to control the reactor during the operating cycle. Sequence intervals affect local power as well as the nuclear reaction rate.

Using a suitable input device (e.g., keyboard, mouse, touch display, etc.), the user may select, via GUI 230, one or more of the optimization parameters by clicking in the selection box 1342 associated with an optimization parameter 1240. When selected, a check appears in the selection box 1342 of the selected optimization parameter. Clicking in the selection box 1342 again de-selects the optimization parameter. For example, to perform an optimization, a user might select the optimize fuel loading and optimize bundle selection boxes 1342, as illustrated in FIG. 13.

Memory (relational database server) 250 may also store constraint parameters associated with the optimization problem. These may be stored in limits database 251 for example. The constraint parameters are parameters of the optimization problem that must or should satisfy a constraint or constraints, where a constraint may be analogous to the limits described above.

FIG. 14 illustrates a screen shot of an exemplary optimization constraints page listing optimization constraints associated with an optimization problem of boiler water reactor core design. As shown, each optimization constraint 1450 has a design value 1452 associated therewith. Each optimization constraint must fall below the specified design value. The user has the ability to select optimization parameters for consideration in configuring the objective function. The user selects an optimization constraint by clicking in the selection box 1454 associated with an optimization constraint 1450. When selected, a check appears in the selection box 1454 of the selected optimization constraint 1450. Clicking in the selection box 1454 again de-selects the optimization constraint.

Each optimization parameter may have a predetermined credit term and credit weight associated therewith stored in relational database server 250. Similarly, each optimization constraint has a predetermined penalty term and penalty weight associated therewith, which may be stored in relational database server 250, such as in limits database 251 and/or objective function values database 257. As seen in FIG. 14, the penalty term incorporates the design value, and the user can change (i.e., configure) this value as desired. Additionally, the embodiment of FIG. 14 allows the user to set an importance 1456 for each optimization constraint 1350. In the importance field 1458 for an optimization constraint, the user may have pull down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above selections have been completed, a calculation server 400 retrieves the selections above from relational database server 250 and configures the objective function according to the generic definition discussed above and the selections made during the selection process. The resulting configured objective function equals the sum of credit components associated with the selected optimization parameters plus the sum of penalty components associated with the selected optimization constraints.

Additionally, this embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in U.S. patent application Ser. No. 10/246,718, entitled METHOD AND APPARATUS FOR ADAPTIVELY DETERMINING WEIGHT FACTORS WITHIN THE CONTEXT OF AN OBJECTIVE FUNCTION, by the inventors of the subject application, filed on Sep. 19, 2002.

Optimization Using the Objective Function

Figure 15:
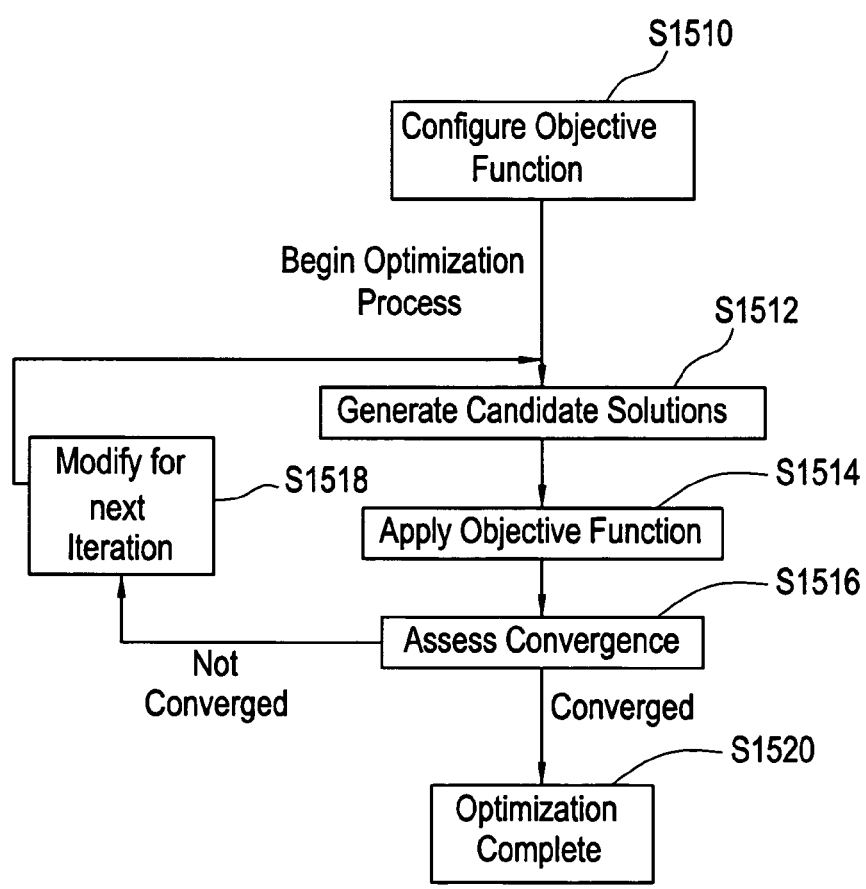
FIG. 15 is a flow chart describing an optimization routine used in accordance with an exemplary embodiment of the invention.

FIG. 15 illustrates a flow chart of an optimization process employing the objective function in accordance with an exemplary embodiment of the present invention. This optimization process is disclosed in U.S. patent application Ser. No. 10/246,716, entitled METHOD AND APPARATUS FOR EVALUATING A PROPOSED SOLUTION TO A CONSTRAINT PROBLEM, by the inventors of the subject application, filed on Sep. 19, 2002.

For the purposes of explanation only, the optimization process of FIG. 15 will be described as being implemented by the architecture illustrated in FIG. 1. As shown, in Step S1510 the objective function is configured as discussed above in the preceding section, then the optimization process begins. In Step S1512, the calculation processors 400 retrieve system inputs from relational database 250, or generate one or more sets of values for input parameters (i.e., system inputs) of the optimization problem based on the optimization algorithm in use. For example, these input parameters may be related to determining fresh and exposed fuel bundles within the reactor, and/or a core design with initial fresh fuel loading pattern for a next fuel cycle of a particular nuclear reactor plant. However, optimization is not limited to using these parameters, as other input parameters might be selected of the rod groups (sequences) and placement of the control rod positions within the groups as a function of time during the cycle, core flow as a function of time during a cycle, reactor coolant inlet pressure, etc.

Each input parameter set of values is a candidate solution of the optimization problem. The core simulator as described above runs a simulated operation and generates a simulation result for each input parameter set of values. The simulation result includes values (i.e., system outputs) for the optimization parameters and optimization constraints. These values, or a subset of these values, are values of the variables in the mathematical expressions of the objective function.

Then, in step S1514, a calculation processor 400 uses the objective function and the system outputs to generate an objective function value for each candidate solution. In step S1516, the calculation processor 400 assesses whether the optimization process has converged upon a solution using the objective function values generated in step S1514. If no convergence is reached, then in step S1518, the input parameter sets are modified, the optimization iteration count is increased and processing returns to step S1512. The generation, convergence assessment and modification operations of steps S1512, S1516 and S1518 are performed according to any well-known optimization algorithm such as Genetic Algorithms, Simulated Annealing, and Tabu Search. When the optimization is utilized to determine an acceptable core design, the optimization is run until convergence (e.g., acceptable results as in steps S93/S193 of FIGS. 7A and 7B) is obtained.

The method and arrangement offer several advantages. As described above, the number of unique fresh fuel bundles within a design refers to the number of streams. Thus, a single-stream design utilizes one customized bundle; a two-stream design utilizes two customized bundles; and so on. Increasing the number of possible streams to N streams, as described above, may correlate to improved fuel cycle costs and safety margin. The greater the customization, the greater the ability of the designer to address local issues, while at the same time maintaining the highest core efficiency.

The present invention therefore allows a user to target specific 'problem' locations in a core design for a fuel-cycle in a systematic manner by perturbing one or several fresh fuel bundles within a core design solution. For example, to 'fix' a shutdown margin problem, one might simply exchange a fresh fuel bundle in the problem location for a fresh bundle containing more gadolinium content. By 'fix', it may be implied that a limiting location in the core may be made non-limiting with some level of margin to a constraint limit. To fix a MFLPD problem, for example, one might target the problem location with a fresh fuel bundle containing axial zoning changes to shift the axial power profile locally.

By targeting and fixing specific problem locations, global changes to the core design my be made that target cycle energy (e.g., a new fresh fuel loading pattern). The magnitude of such global changes may be such that new local problems arise. Using the method and arrangement of the invention, a process of local and global change can then be repeated. With each iteration of local/global change, an increasing number of local problem locations may arise as the design is 'pushed' towards improved energy. When no further local changes are possible, the core design solution is complete.

The technical effect of the invention is a computer-based arrangement that provides a way to efficiently develop a core design for a nuclear reactor, as well as a computer-based method for providing internal and external users the ability to quickly develop, simulate, modify and perfect a core design with a specified loading pattern for fresh fuel assemblies that are to be loaded in a core of a nuclear reactor at a next scheduled outage.

The invention being thus described, it will be obvious that the same may be varied in many ways. Such variations are not to be regarded as a departure from the spirit and scope of the invention, and all such modifications as would be obvious to one skilled in the are intended to be included within the scope of the following claims.

What is claimed:

1. A method of determining a core design for a nuclear reactor, comprising the steps of:
   defining a set of limits applicable to determining a core design;
   generating a reference core design based on the defined limits, the reference core design including an initial loading pattern of current fresh fuel bundles arranged in a plurality of fuel locations within the reference core design;
   selecting a unique subset of fresh fuel bundles to be evaluated in the reference core design; and
   performing a first iteration to determine an accepted core design, the first iteration comprising
       replacing, at each fuel location, the current fresh fuel bundle with one of the selected fresh fuel bundles
       simulating reactor operation on the reference core design to produce a plurality of outputs, each output corresponding to the reference core design containing one or more of the selected fresh fuel bundles; and
       ranking the outputs based on the defined set of limits, the highest ranked output representing an accepted core design for the nuclear reactor.

2. The method of claim 1, further comprising:
   setting the accepted core design as a new reference core design with corresponding fresh fuel loading pattern, if the highest ranked output is an improvement over the reference core design; and
   performing a second iteration of the replacing, simulating and ranking steps to determine a revised accepted core design,
   else providing data related to limits violated during the simulation, if the highest ranked output is no improvement over the reference core design.

3. The method of claim 2, wherein the defined limits are applicable to the new reference core design.

4. The method of claim 2, wherein the highest ranked output from said second iteration represents an output that, based on the defined set of limits, shows a greatest improvement in performance as compared to the highest ranked output of the first iteration.

5. The method of claim 4, wherein the performance relates to at least one or more of the defined limits.

6. The method of claim 4 further comprising
   iteratively repeating the setting, replacing, simulating and ranking steps over N iterations until there is no further improvement in performance between highest ranked outputs of successive iterations, wherein the performance relates to at least one or more of the defined limits.

7. The method of claim 6, wherein the defined limits are applicable to the reference core design in each of the N iterations.

8. The method of claim 1, wherein the defining step further includes:
   defining limits applicable to variables that are to be input for performing the simulating step; and
   defining limits applicable to the outputs from the simulating step.

9. The method of claim 8, wherein the limits applicable to the variables input for performing the simulating step are related to desired core performance constraints.

10. The method of claim 8, wherein the limits applicable to the outputs from the simulating step are related to operational and safety limits for reactor operation and margins to those operational and safety limits.

11. The method of claim 1, wherein the simulating step further includes:
   simulating reactor operation with each fuel bundle of said unique subset at each evaluated location in the reference core design to obtain an output for each location.

12. The method of claim 1, wherein the ranking step further includes:
configuring an application-specific objective function to evaluate the outputs; and
generating a figure of merit value for each output using the application-specific objective function; and
ranking the figure of merit values based on the defined limits.

13. The method of claim 12, wherein one of the defined limits relates to a desired core performance constraint.

14. The method of claim 1, wherein the nuclear reactor is selected from a group comprising a boiling water reactor, a pressurized water reactor, a gas-cooled reactor and a heavy water reactor.

15. The method of claim 1, the method implemented within a computer-based medium, said defining, generating and selecting steps effected via a user interface of said computer-based medium.

16. The method of claim 15, wherein said selecting step further includes:
displaying performance characteristics of a plurality of fresh fuel bundle types using the user interface, the plurality of fresh fuel bundle types having been created, modeled, and stored in advance; and
graphically selecting desired fresh fuel bundle types as said selected unique subset using the user interface.

17. A method of determining a core design for a nuclear reactor, comprising the steps of:
defining a set of limits applicable to determining a core design;
selecting a unique subset of fresh fuel bundles to be evaluated in a reference core design that includes an initial loading pattern of current fresh fuel bundles arranged in a plurality of fuel locations; and
performing N iterations to determine an accepted core design, each of said N iterations comprising the steps of:
replacing, at each fuel location, the current fresh fuel bundle with one of the selected fresh fuel bundles;
simulating reactor operation on the reference core design to produce a plurality of outputs, each output corresponding to the reference core design containing one or more of the selected fresh fuel bundles; and
ranking the outputs based on the defined set of limits, the highest ranked output representing an accepted core design for the nuclear reactor,
an accepted core design in an Nth−1 iteration being set as the reference core design for an Nth iteration, and
said N iterations being performed until there is no further improvement toward a core performance criteria, as between highest ranked outputs of successive iterations; and
outputting a final accepted core design for the nuclear reactor.

18. The method of claim 17, wherein the performance criteria relates to at least one or more of the defined limits.

19. The method of claim 17, wherein the nuclear reactor is selected from a group comprising a boiling water reactor, a pressurized water reactor, a gas-cooled reactor, a liquid-metal reactor or a heavy water reactor.

20. A method of operating a nuclear reactor using a core design developed in accordance with the method of claim 1.

21. A computer program product comprising a computer-readable medium having computer program logic stored thereon for enabling a processor to determine a core design for a nuclear reactor, the computer program logic causing the processor to perform the steps of:
accepting limits related to a core design, the limits being input by a user having electronic access thereto;
generating a reference core design based on the defined limits, the reference core design including an initial loading pattern of current fresh fuel bundles arranged in a plurality of fuel locations within the reference core design;
selecting a unique subset of fresh fuel bundles to be evaluated in the reference core design; and
performing a first iteration to determine an accepted core design, the first iteration comprising
replacing, at each fuel location, the current fresh fuel bundle with one of the selected fresh fuel bundles;
simulating reactor operation on the reference core design to produce a plurality of outputs, each output corresponding to the reference core design containing one or more of the selected fresh fuel bundles; and
ranking the outputs based on the defined set of limits, the highest ranked output representing an accepted core design for the nuclear reactor.

22. The computer program product of claim 21, the computer program logic further causing the processor to perform the steps of:
setting the accepted core design as a new reference core design with corresponding fresh fuel loading pattern, if the highest ranked output is an improvement over the reference core design; and
performing a second iteration of the replacing, simulating and ranking steps to determine a revised accepted core design,
else providing data related to limits violated during the simulation, if the highest ranked output is no improvement over the reference core design.

23. The computer program product of claim 22, the computer program logic further causing the processor to perform the steps of:
iteratively repeating the setting, replacing, simulating and ranking steps over N iterations until there is no further improvement in performance between highest ranked outputs of successive iterations, wherein the performance relates to at least one or more of the defined limits; and
outputting data related to a final acceptable core design for the nuclear reactor.

24. A computer system arrangement for determining a core design for a nuclear reactor, comprising:
a memory for storing a unique subset of fresh fuel bundles to be evaluated in a reference core design;
an interface for receiving a set of limits applicable to the reference core design, and for selecting a unique subset of fresh fuel bundles to be evaluated in the reference core design; and
a processor arrangement for generating the reference core design based on the received limits, the reference core design including an initial loading pattern of current fresh fuel bundles arranged in a plurality of fuel locations within the reference core design,
the processor arrangement configured to implement
a replacing function to replace, at each fuel location, the current fresh fuel bundle with one of the selected fresh fuel bundles;
a simulating function to direct simulation of reactor operation on the reference core design to produce a plurality of outputs, each output corresponding to the reference core design containing one or more of the selected fresh fuel bundles; and a ranking function to rank the outputs based on the defined set of limits, the highest ranked output representing an accepted core design for the nuclear reactor.

25. The computer system arrangement of claim 24, wherein the memory further stores an application specific objective function that is based on a generic objective function definition being a sum of a first number of credit terms plus a sum of a second number of penalty terms, the set of limits received by the interface includes credit term variables related to credit terms of the application specific objective function and penalty term variables related to penalty terms of the application specific objective function, and the processor arrangement, based on the credit term variables and penalty term variables, evaluates the outputs using the application specific objective function to generate a figure of merit value for each output.

26. The computer system arrangement of claim 25, wherein the processor arrangement ranks the outputs based on the generated figure of merit values.

27. The computer system arrangement of claim 24, wherein the set of limits are received from one of a user or a simulator.

28. The computer system arrangement of claim 24, wherein the interface is a graphical user interface.

29. The computer system arrangement of claim 28, wherein the graphical user interface communicates with a user over one of an internet or intranet.

30. The computer system arrangement of claim 24, wherein the replacing, simulating and ranking functions represent a first iteration, the interface receives commands to modify the accepted core design, and the processor arrangement performs a second iteration of replacing, simulating and ranking functions to determine a refined core design.

31. The computer system arrangement of claim 30, wherein the memory iteratively stores each modified accepted core design, the processor sets an accepted core design from a previous iteration as the reference core design for a current iteration and iteratively repeats, for N iterations, the setting, replacing, simulating and ranking functions until there is no further improvement in performance between highest ranked outputs of successive iterations, and the interface outputting data related to a final, acceptable core design to the user.

* * * * *